United States Patent
Ohta et al.

(10) Patent No.: US 9,222,145 B2
(45) Date of Patent: Dec. 29, 2015

(54) SOFT MAGNETIC ALLOY RIBBON AND ITS PRODUCTION METHOD, AND MAGNETIC DEVICE HAVING SOFT MAGNETIC ALLOY RIBBON

(75) Inventors: Motoki Ohta, Osaka (JP); Yoshihito Yoshizawa, Osaka (JP)

(73) Assignee: HITACHI METALS, LTD., Tokyo (JP)

( * ) Notice: Subject to any disclaimer, the term of this patent is extended or adjusted under 35 U.S.C. 154(b) by 392 days.

(21) Appl. No.: 13/145,191

(22) PCT Filed: Jan. 20, 2010

(86) PCT No.: PCT/JP2010/050647
§ 371 (c)(1),
(2), (4) Date: Jul. 19, 2011

(87) PCT Pub. No.: WO2010/084888
PCT Pub. Date: Jul. 29, 2010

(65) Prior Publication Data
US 2011/0272065 A1 Nov. 10, 2011

(30) Foreign Application Priority Data
Jan. 20, 2009 (JP) .................. 2009-010108

(51) Int. Cl.
| C21D 6/00 | (2006.01) |
| C21D 8/12 | (2006.01) |
| B82Y 25/00 | (2011.01) |
| B82Y 30/00 | (2011.01) |

(Continued)

(52) U.S. Cl.
CPC .............. *C21D 8/1211* (2013.01); *B82Y 25/00* (2013.01); *B82Y 30/00* (2013.01); *C21D 1/74* (2013.01);
(Continued)

(58) Field of Classification Search
CPC .................................. C21D 6/00; C21D 1/00
USPC ................................................. 148/540, 304
See application file for complete search history.

(56) References Cited

U.S. PATENT DOCUMENTS

| 5,725,686 A * | 3/1998 | Yoshizawa et al. ........... 148/307 |
| 7,935,196 B2 * | 5/2011 | Ohta et al. .................... 148/304 |

(Continued)

FOREIGN PATENT DOCUMENTS

| JP | 1-1156451 A | 6/1989 |
| JP | 6-346219 A | 12/1994 |

(Continued)

OTHER PUBLICATIONS

English Machine Translation of JP H06-346219 A.*

*Primary Examiner* — Jie Yang
(74) *Attorney, Agent, or Firm* — Sughrue Mion, PLLC

(57) ABSTRACT

A method for producing a soft magnetic alloy ribbon having a composition represented by $Fe_{100-x-y-z}A_xB_yX_z$, wherein A is Cu and/or Au, X is at least one element selected from the group consisting of Si, S, C, P, Al, Ge, Ga and Be, and x, y and z are numbers (by atomic %) meeting the conditions of $0<x\le5$, $10\le y\le22$, $1\le z\le10$, and $x+y+z\le25$, and comprising a matrix phase in which fine crystal grains having an average diameter of 60 nm or less are dispersed at a volume fraction of 50% or more, part of an oxide film formed on the surface being a layer having a lower B concentration than the average B concentration of the matrix phase; comprising the steps of (1) ejecting an alloy melt having the above composition onto a rotating cooling roll for quenching, to form a primary fine-crystalline alloy ribbon having a matrix phase, in which fine crystal nuclei having an average diameter of 30 nm or less are dispersed at a volume fraction of more than 0% and less than 30% in an amorphous phase; and then (2) annealing the primary fine-crystalline alloy ribbon in an atmosphere having an oxygen concentration of 6-18%.

2 Claims, 12 Drawing Sheets

(51) Int. Cl.
*C21D 1/74* (2006.01)
*C21D 1/76* (2006.01)
*C22C 38/02* (2006.01)
*C22C 38/16* (2006.01)
*C22C 38/32* (2006.01)
*H01F 1/153* (2006.01)

(52) U.S. Cl.
CPC ............... *C21D 1/76* (2013.01); *C21D 8/1244* (2013.01); *C22C 38/02* (2013.01); *C22C 38/16* (2013.01); *C22C 38/32* (2013.01); *H01F 1/153* (2013.01); *H01F 1/15333* (2013.01); *C21D 2201/03* (2013.01); *H01F 1/15391* (2013.01)

(56) References Cited

U.S. PATENT DOCUMENTS

| | | | |
|---|---|---|---|
| 8,007,600 B2 * | 8/2011 | Ohta et al. | 148/121 |
| 2001/0007266 A1 | 7/2001 | Sunakawa et al. | |
| 2010/0108196 A1 * | 5/2010 | Ohta et al. | 148/121 |

FOREIGN PATENT DOCUMENTS

| | | |
|---|---|---|
| JP | 2001-252749 A | 9/2001 |
| WO | 2008/114605 A1 | 9/2008 |

* cited by examiner

SOFT MAGNETIC ALLOY RIBBON AND ITS PRODUCTION METHOD, AND MAGNETIC DEVICE HAVING SOFT MAGNETIC ALLOY RIBBON

CROSS REFERENCE TO RELATED APPLICATIONS

This application is a National Stage of International Application No. PCT/JP2010/050647, filed Jan. 20, 2010, claiming priority based on Japanese Patent Application No. 2009-010108, filed Jan. 20, 2009, the contents of all of which are incorporated herein by reference in their entirety.

FIELD OF THE INVENTION

The present invention relates to a soft magnetic alloy ribbon having a high saturation magnetic flux density and low core loss, as well as excellent insulation, corrosion resistance and toughness, and its production method, and a magnetic device comprising such soft magnetic alloy ribbon.

BACKGROUND OF THE INVENTION

Soft magnetic materials used for various transformers, reactors, choke coils, noise reduction parts, laser power sources, magnetic pulse power devices for accelerators, motors, power generators, etc. include silicon steel, ferrite, amorphous alloys, Fe-based, nano-crystalline alloys, etc. Silicon steel is inexpensive and has a high magnetic flux density, but it suffers large core loss in high-frequency applications, and it cannot be easily made thin unlike amorphous ribbons. Because of a low saturation magnetic flux density, ferrite is easily saturated magnetically in high-power applications with large operation magnetic flux densities. Co-based amorphous alloys are expensive and have as low saturation magnetic flux density as 1 T or less with practical compositions, providing large parts when used for high-power applications. In addition, because of thermal instability, the Co-based amorphous alloys change with time, resulting in increased core loss.

As an amorphous alloy based on inexpensive Fe, JP 5-140703 A discloses an Fe-based, amorphous alloy for transformer cores, which has a composition represented by $(Fe_a Si_b B_c C_d)_{100-x} Sn_x$, wherein a=0.80-0.86, b=0.01-0.12, c=0.06-0.16, d=0.001-0.04, a+b+c+d=1, and x=0.05-1.0, by atomic %, and has excellent soft magnetic properties (large magnetic flux density, low coercivity and a good squareness ratio). However, the theoretical upper limit of a saturation magnetic flux density determined by the interatomic distance, the coordination number and the Fe concentration is as low as 1.65 T, and this Fe-based, amorphous alloy has large magnetostriction, characteristics deteriorated by stress, and a poor S/N ratio in an audible frequency band. To improve the saturation magnetic flux density of the Fe-based, amorphous alloy, it was proposed to substitute part of Fe with Co, Ni, etc., but its effect is small despite high cost.

JP 1-156451 A discloses a soft-magnetic, Fe-based, nano-crystalline alloy having a composition represented by $(Fe_{1-a} Co_a)_{100-x-y-z-\alpha} Cu_x Si_y B_z M'_\alpha$, wherein M' is at least one element selected from the group consisting of Nb, W, Ta, Zr, Hf, Ti and Mo, and a, x, y, z and $\alpha$ are numbers (by atomic %) meeting the conditions of $0 \leq a \leq 0.3$, $0.1 \leq x \leq 3$, $3 \leq y \leq 6$, $4 \leq z \leq 17$, $10 \leq y+z \leq 20$, and $0.1 \leq \alpha \leq 5$, 50% or more of its structure being composed of crystal grains having an average diameter of 1000 Å or less. However, because this Fe-based, nano-crystalline alloy is obtained by forming an amorphous alloy and then finely crystallizing it by a heat treatment, it has only a saturation magnetic flux density of about 1.5 T.

As a method for producing an Fe-based, nano-crystalline alloy ribbon, JP 2001-252749 A discloses a method of pouring an Fe-based alloy melt containing 10 atomic % or less of B onto a cooling roll, stripping the resultant amorphous ribbon from the cooling roll in a temperature range of 100-300° C., and then annealing it at the crystallization temperature or higher (for instance, 550° C.). However, JP 2001-252749 A fails to describe the heat treatment atmosphere. Because quenching and stripping are conducted in an inert gas atmosphere, it is reasonable to presume that the heat treatment also is conducted in an inert gas atmosphere.

Japanese Patent 3,639,689 discloses a method for producing an Fe-based, nano-crystalline alloy ribbon comprising ejecting an alloy melt having a composition represented by $(Fe_a Si_b B_c C_d)_{100-x} P_x$, wherein a, b, c and d are numbers (by atomic %) meeting the conditions of $70 \leq a \leq 86$, $1 \leq b \leq 19$, $7 \leq c \leq 20$, $0.02 \leq d \leq 4$, and a+b+c+d=100, and x is percentage by weight meeting $0.003 \leq x \leq 0.1$, onto a moving, cooling substrate through a slot nozzle to quench it to form an amorphous ribbon of 30 μm or less in thickness, and annealing it; an average cooling speed from the melting point of the alloy to a temperature range of 150-320° C. being at least $10^{3\circ}$ C./second, and the ribbon being stripped from the cooling substrate when reaching the temperature of 150° C.-320° C. The annealing was conducted at 360° C. for 1 hour. Japanese Patent 3,639,689 also fails to describe the annealing atmosphere. Because quenching is conducted in an inert gas atmosphere, it is reasonable to presume that the annealing also is conducted in an inert gas atmosphere.

JP 2006-40906 A discloses a method for producing a soft magnetic alloy ribbon comprising quenching an Fe-based alloy melt to form a 180°-bendable ribbon having a mixed phase structure in which an α-Fe crystal phase having an average diameter of 50 nm or less is precipitated in an amorphous phase, and annealing the ribbon at a temperature higher than the crystallization temperature of the α-Fe crystal phase. However, this soft magnetic alloy ribbon unsatisfactorily has a saturation magnetic flux density of about 1.6 T.

JP 2008-231533 A discloses a soft-magnetic, Fe-based alloy ribbon having a composition represented by $Fe_{100-x-y} A_x X_y$, wherein A is Cu and/or Au, X is at least one element selected from the group consisting of B, Si, S, C, P, Al, Ge, Ga and Be, x and y are numbers (by atomic %) meeting the conditions of $0 \leq x \leq 5$, and $10 \leq y \leq 24$, and having a matrix phase structure in a depth of more than 120 nm from the ribbon surface, in which body-centered-cubic crystal grains having an average diameter of 60 nm or less are dispersed at a volume fraction of 30% or more in an amorphous phase, and an amorphous layer in a depth within 120 nm from the ribbon surface. This soft-magnetic, Fe-based alloy ribbon is produced by quenching an Fe-based alloy melt to form an Fe-based alloy ribbon having fine crystal grains having an average diameter of 30 nm or less precipitated at a volume fraction of less than 30% in the amorphous phase, and annealing this Fe-based alloy ribbon at an average temperature-elevating speed of 100° C./minute or more in a temperature range of 300° C. or higher. This soft magnetic Fe-based alloy ribbon has a high saturation magnetic flux density of 1.7 T or more and low coercivity.

JP 2008-231533 A describes that the heat treatment can be conducted in the air, in vacuum, or in an inert gas such as Ar, nitrogen, helium, etc., particularly preferably in the inert gas. However, there is no Example conducting the heat treatment in the air. When the Fe-based alloy ribbon having fine crystal grains having an average diameter of 30 nm or less precipitated at a volume fraction of less than 30% in the amorphous phase is annealed in the air, too thick an oxide film is formed on the surface. As a result, it has high insulation, but its important saturation magnetic flux density tends to be lower.

OBJECT OF THE INVENTION

Accordingly, an object of the present invention is to provide a soft magnetic alloy ribbon having not only a high saturation magnetic flux density and low core loss but also excellent insulation, corrosion resistance and toughness, its production method, and a magnetic device comprising it.

DISCLOSURE OF THE INVENTION

As a result of intense research in view of the above objects, the inventors have found that to produce a soft magnetic ribbon of an Fe-based, alloy having a high saturation magnetic flux density and low core loss as well as excellent insulation, corrosion resistance and toughness, it is important to control an oxygen concentration in an atmosphere for annealing a primary fine-crystalline alloy ribbon having fine crystal nuclei. The present invention has been completed based on such finding.

Thus, the first soft magnetic alloy ribbon of the present invention has a composition represented by $Fe_{100-x-y-z}A_xB_yX_z$, wherein A is Cu and/or Au, X is at least one element selected from the group consisting of Si, S, C, P, Al, Ge, Ga and Be, and x, y and z are numbers (by atomic %) meeting the conditions of $0<x\leq5$, $10\leq y\leq22$, $1\leq z\leq10$, and $x+y+z\leq25$, and comprises a matrix phase in which fine crystal grains having an average diameter of 60 nm or less are dispersed at a volume fraction of 50% or more in an amorphous phase, and an amorphous layer having a higher B concentration than that in the matrix phase in a depth range from the surface to 30-130 nm.

In the first soft magnetic alloy ribbon, the amount of B in the high-B-concentration, amorphous layer is preferably more than that in the matrix phase by 0.5 atomic % or more. The first soft magnetic alloy ribbon preferably has a layer as deep as up to 50 nm from the surface having a lower Cu concentration than that on the surface. The amount of Cu in the low-Cu-concentration layer is preferably less than 50% of that in the matrix phase.

The second soft magnetic alloy ribbon of the present invention has a composition represented by $Fe_{100-x-y-z}A_xB_yX_z$, wherein A is Cu and/or Au, X is at least one element selected from the group consisting of Si, S, C, P, Al, Ge, Ga and Be, and x, y and z are numbers (by atomic %) meeting the conditions of $0<x\leq5$, $10\leq y\leq22$, $1\leq z\leq10$, and $x+y+z\leq25$, and comprises a matrix phase in which fine crystal grains having an average diameter of 60 nm or less are dispersed at a volume fraction of 50% or more in an amorphous phase, and a surface oxide film; part of the oxide film being a layer having a lower B concentration than the average B concentration of the matrix phase.

In the second soft magnetic alloy ribbon, the average B concentration in a depth up to 10 nm from the surface is preferably 1 atomic % or less. The B/Fe atomic ratio in the oxide film in a depth up to 10 nm from the surface is preferably 1/20 or less. The average Cu concentration in a depth up to 10 nm from the surface is preferably 2 atomic % or less. The Cu/Fe atomic ratio in the oxide film is preferably 1/10 or less. The average Fe concentration in the oxide film is preferably 10 atomic % or more.

In the first and second soft magnetic alloy ribbons, Si and/or P are preferably indispensable among the element X. part of Fe may be substituted by at least one element selected from the group consisting of Ni, Mn, Co, V, Cr, Ti, Zr, Nb, Mo, Hf, Ta and W in a range of 1.5 atomic % or less of the alloy.

The magnetic device of the present invention comprises any one of the above soft magnetic alloy ribbons.

The method of the present invention for producing the first soft magnetic alloy ribbon comprises the steps of (1) ejecting an alloy melt having the above composition onto a rotating cooling roll for quenching, to form a primary fine-crystalline alloy ribbon having a matrix phase, in which fine crystal nuclei having an average diameter of 30 nm or less are dispersed at a volume fraction of more than 0% and less than 30% in an amorphous phase; the primary fine-crystalline alloy ribbon being stripped from the cooling roll when reaching a temperature of 170-350° C.; and then (2) annealing the primary fine-crystalline alloy ribbon in an atmosphere containing a low concentration of oxygen. The oxygen concentration in the heat treatment atmosphere is preferably 6-18%.

The method of the present invention for producing the second soft magnetic alloy ribbon comprises the steps of (1) ejecting an alloy melt having the above composition onto a rotating cooling roll for quenching, to form a primary fine-crystalline alloy ribbon having a matrix phase, in which fine crystal nuclei having an average diameter of 30 nm or less are dispersed at a volume fraction of more than 0% and less than 30% in an amorphous phase; and then (2) annealing the primary fine-crystalline alloy ribbon in an atmosphere having an oxygen concentration of 6-18%.

In the first and second soft magnetic alloy ribbons, layers are not divided by clear boundaries, but they are ranges in a thickness direction meeting the predetermined conditions.

DESCRIPTION OF THE PREFERRED EMBODIMENTS

[1] Magnetic Alloy (1) Composition

Figure 1:
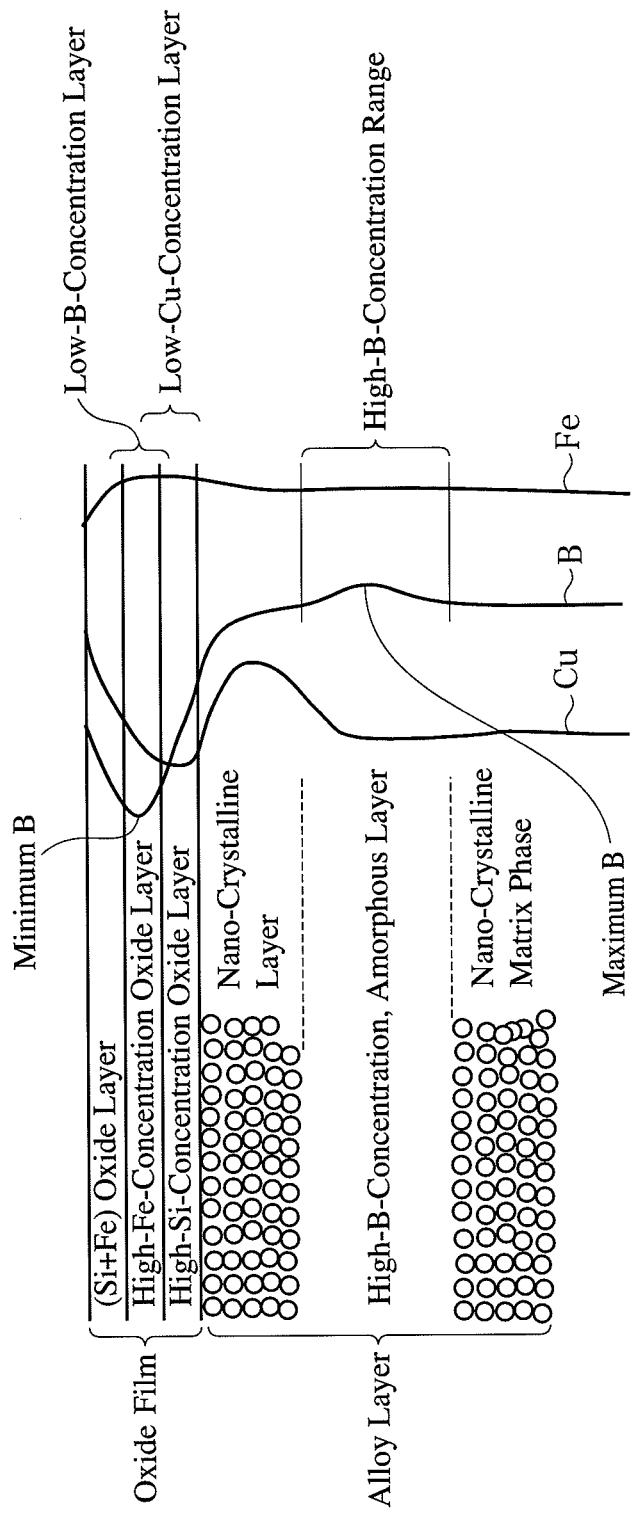
FIG. 1 is a schematic view showing the microstructure of a surface region of the soft magnetic alloy ribbon of the present invention.

The soft magnetic alloy ribbon of the present invention has a composition represented by $Fe_{100-x-y-z}A_xB_yX_z$, wherein A is Cu and/or Au, X is at least one element selected from the group consisting of Si, S, C, P, Al, Ge, Ga and Be, and x, y and z are numbers (by atomic %) meeting the conditions of $0 < x \leq 5$, $10 \leq y \leq 22$, $1 \leq z \leq 10$, and $x+y+z \leq 25$. To have a saturation magnetic flux density Bs of 1.7 T or more, the soft magnetic alloy ribbon should have a structure containing fine (nano-crystalline) crystals of bcc-Fe. To this end, the Fe concentration should be high. Specifically, the Fe concentration should be 75 atomic % or more, preferably 77 atomic % or more.

In the above composition ranges, a range defined by $0.3 \leq x \leq 2.0$, $10 \leq y \leq 20$, and $1 \leq z \leq 10$ provides a saturation magnetic flux density of 1.74 T or more. Further, a range defined by $0.5 \leq x \leq 1.5$, $10 \leq y \leq 18$, and $2 \leq z \leq 9$ provides a saturation magnetic flux density of 1.78 T or more. In addition, a range defined by $0.5 \leq x \leq 1.5$, $10 \leq y \leq 16$, and $3 \leq z \leq 9$ provides a saturation magnetic flux density of 1.8 T or more.

To have both soft magnetic properties and a saturation magnetic flux density Bs of 1.7 T or more, this alloy composition is an Fe—B—Si-based alloy having a stable amorphous phase even at a high Fe concentration, and containing nucleus-forming elements. Specifically, Cu and/or Au not forming a solid solution with Fe are added to an Fe—B—Si-based alloy having an Fe concentration of 88 atomic % or less, which can stably provide a ribbon having an amorphous phase as a main phase, to precipitate fine crystal nuclei, and then a heat treatment is conducted so that fine crystal grains uniformly grow.

When the amount x of the element A is too small, it is difficult to achieve fine crystallization. Oppositely, when the amount x exceeds 5 atomic %, amorphous-phase-based ribbons obtained by quenching their melts are brittle. The amount x of the element A is preferably 0.3-2, more preferably 0.5-1.6, most preferably 1-1.5, particularly 1.2-1.5. The preferable element A is Cu from the aspect of cost. When Au is contained, the amount of Au is preferably 1.5 atomic % or less of Fe.

B (boron) is an element accelerating the formation of the amorphous phase. When B is less than 10 atomic %, it is difficult to obtain a ribbon having an amorphous phase as a main phase. When B exceeds 22 atomic %, the saturation magnetic flux density becomes less than 1.7 T. Thus, meeting the conditions of $10 \leq y \leq 22$ (atomic %), the amorphous phase can be obtained stably with a high saturation magnetic flux density. The amount y of B is preferably 12-20, more preferably 12-18, most preferably 12-16.

The addition of the element X (particularly Si) elevates a temperature at which Fe—B or Fe—P (when P is added) having large crystal magnetic anisotropy is precipitated, resulting in a higher heat treatment temperature. A high heat treatment temperature increases the percentage of a fine crystal phase, thereby increasing Bs, improving the squareness ratio of a B—H curve, and suppressing the deterioration and discoloration of the ribbon surface. Among the element X, Si is preferably 8 atomic % or more. When the amount z of the element X is less than 1 atomic %, it is difficult to obtain a ribbon having an amorphous phase as a main phase. When the amount z is more than 10 atomic %, Bs is less than 1.7 T. The amount z of the element X is preferably 2-9, more preferably 3-8, most preferably 4-7.

Among the element X, P is an element enhancing the formation of the amorphous phase, suppressing the growth of fine crystal grains. P also suppresses the segregation of B in the oxide film. Accordingly, P is preferable to achieve high toughness, high Bs and good soft magnetic properties. The addition of P prevents the soft magnetic alloy ribbon from being cracked, for instance, when it is wound around a round rod of 1 mm in radius. This effect can be obtained regardless of the temperature-elevating speed of the nano-crystallization heat treatment. Other elements of S, C, Al, Ge, Ga and Be can be used as the element X. With these elements, the magnetostriction and the magnetic properties can be adjusted. The element X is easily segregated toward the surface, effective for forming a strong oxide film.

Part of Fe may be substituted by at least one element selected from the group consisting of Ni, Mn, Co, V, Cr, Ti, Zr, Nb, Mo, Hf, Ta and W. Among these elements, Ni, Mn, Co, V and Cr are effective to shift the high-B-concentration region toward the surface, providing a structure close to the matrix phase in a region near the surface, to increase the soft magnetic properties (permeability, coercivity, etc.) of the soft magnetic alloy ribbon. In addition, they are predominantly contained in the amorphous phase remaining after the heat treatment together with the element A and metalloid elements, suppressing the growth of high-Fe-concentration, fine crystal grains and reducing the average diameter of fine crystal grains, thereby improving the saturation magnetic flux density Bs and the soft magnetic properties. Particularly when part of Fe is substituted by Co or Ni soluble in Fe together with the element A, a larger amount of the element A can be added, making the crystal structure finer to improve the soft magnetic properties. Ti, Zr, Nb, Mo, Hf, Ta and W are also predominantly contained in the amorphous phase remaining after the heat treatment together with the element A and metalloid elements, contributing to the improvement of saturation magnetic flux density Bs and soft magnetic properties. On the other hand, when these elements having large atomic weights are added too much, the amount of Fe per a unit weight decreases, resulting in poorer soft magnetic properties. The total amount of these elements is preferably 3 atomic % or less. Particularly in the case of Nb and Zr, their total amount is preferably 2.5 atomic % or less, more preferably 1.5 atomic % or less. In the case of Ta and Hf, their total amount is preferably 1.5 atomic % or less, more preferably 0.8 atomic % or less.

Part of Fe may be substituted by at least one element selected from the group consisting of Re, Y, Zn, As, Ag, In, Sn, Sb, platinum-group elements, Bi, N, O and rare earth elements, to obtain the above effects. The total amount of these elements is preferably 5 atomic % or less, more preferably 2 atomic % or less. Particularly to obtain a high saturation magnetic flux density, the total amount of these elements is preferably 1.5 atomic % or less, more preferably 1.0 atomic % or less.

(2) Structure of Surface Region

In the soft magnetic alloy ribbon of the present invention, particularly in that containing Si, the high-Si-concentration surface oxide layer is formed when quenched. By a subsequent nano-crystallization heat treatment in an oxygen-containing atmosphere, Si and Fe are diffused to a surface region, as schematically shown in FIG. 1, forming an oxide film as thick as about 30 nm in total, which comprises a high-Si-concentration oxide layer, a high-Fe-concentration oxide layer and an (Si+Fe) oxide layer in this order from the matrix phase. Existing between the oxide film and the nano-crystalline matrix phase are a nano-crystalline layer, a high-B-concentration, amorphous layer, and if any, a coarse, nano-crystalline layer in this order from the oxide film. This surface region structure appears to provide good soft magnetic properties and excellent insulation and corrosion resistance. Most important to obtain this structure is the formation of the high-B-concentration, stable, amorphous layer.

Large amounts of Fe and Si are diffused toward the surface by the nano-crystallization heat treatment in an oxygen-containing atmosphere, forming an oxide film comprising a high-Si-concentration oxide layer, a high-Fe-concentration oxide layer, and an (Si+Fe) oxide layer in this order from the matrix phase. The oxide film has an important function to improve the insulation and corrosion resistance of the alloy, and particularly insulation is very important to reduce eddy current loss between ribbons in wound cores and laminate cores. A large amount of B is also diffused toward the surface by the nano-crystallization heat treatment in an oxygen-containing atmosphere. Because B is easily dissolved in Si, the B concentration is high in the high-Si-concentration oxide layer and the (Si+Fe) oxide layer, and correspondingly very low in the high-Fe-concentration oxide layer, forming the low-B-concentration layer. The average B concentration in a depth up to 10 nm from the surface is 1 atomic % or less, and it is likely that there is the minimum B concentration in the low-B-concentration layer. The B/Fe atomic ratio in the oxide film in a depth up to 10 nm from the surface is 1/20 or less, preferably 1/40 or less.

Formed between the oxide film and the nano-crystalline matrix phase having substantially the same B concentration as in the alloy composition and having excellent soft magnetic properties but low toughness are a nano-crystalline layer and an amorphous layer in this order from the oxide film, and more B is contained in the amorphous layer. As a result, the B concentration is 0.5 atomic % or more higher in the amorphous layer than in the matrix phase. This high-B-concentration, amorphous layer (containing Fe—B) has a smaller thermal expansion coefficient than that of the bcc-Fe-based, fine crystal grains, providing the soft magnetic alloy ribbon with reduced heat shock and high toughness. Thus, with a structure with function gradient comprising the oxide film having high insulation and corrosion resistance, the high-B-concentration, amorphous layer having high toughness and a high heat-shock-reducing function, and the nano-crystalline matrix phase having excellent soft magnetic properties and a high saturation magnetic flux density Bs, the soft magnetic alloy ribbon of the present invention has high corrosion resistance, high insulation, high toughness and a high saturation magnetic flux density, as well as low core loss.

When the heat treatment atmosphere does not contain sufficient oxygen, the diffusion of Fe and Si is insufficient, the oxide film has a low B concentration because of the reduced diffusion of B, and the high-B-concentration, amorphous layer is not formed. As a result, crystal grains become coarser, resulting in larger effective crystal magnetic anisotropy, poorer soft magnetic properties, and insufficient toughness.

With a positive mixing heat with Fe, more Cu avoids the oxide film containing 10 atomic % or more of Fe, and is segregated nearer the alloy layer surface, forming a low-Cu-concentration layer in the oxide film. The average B concentration in a depth up to 10 nm from the surface is 2 atomic % or less, and the Cu/Fe atomic ratio in the oxide film in a depth up to 10 nm from the surface is 1/10 or less, preferably 1/20 or less.

(3) Structure of Matrix Phase

The annealed matrix phase has a structure in which body-centered-cubic (bcc), fine crystal grains having an average diameter of 60 nm or less are dispersed in an amorphous phase at a volume fraction of 30% or more. The average diameter of fine crystal grains exceeding 60 nm provides lower soft magnetic properties. Less than 30% by volume of fine crystal grains make the percentage of the amorphous phase too much, providing a low saturation magnetic flux density. The average diameter of fine crystal grains after heat treatment is preferably 40 nm or less, more preferably 30 nm or less. The volume fraction of fine crystal grains after heat treatment is preferably 50% or more, more preferably 60% or more. The average diameter of 60 nm or less and the volume fraction of 30% or more provide alloy ribbons with lower magnetostriction and higher soft magnetic properties than those of Fe-based, amorphous alloys. Even with the same composition, Fe-based, amorphous alloy ribbons have relatively large magnetostriction due to a magnetic volume effect, but the soft magnetic alloy ribbon of the present invention having bcc-Fe-based, fine crystal grains dispersed has much smaller magnetostriction due to the magnetic volume effect, and thus having a larger noise reduction effect.

[2] Production Method (1) Alloy Melt

An alloy melt containing Fe and metalloid elements has a composition represented by $Fe_{100-x-y-z}A_xB_yX_z$, wherein A is Cu and/or Au, X is at least one element selected from the group consisting of Si, S, C, P, Al, Ge, Ga and Be, and x, y and z are numbers (by atomic %) meeting the conditions of $0<x\le5$, $10\le y\le22$, $1\le z\le10$, and $x+y+z\le25$. Taking for example a case where Cu is used as the element A, the production method of the present invention will be explained below in detail.

(2) Quenching of Melt

The quenching of the melt can be conducted by a single-roll method. The melt temperature is preferably 50-300° C. higher than the melting point of the alloy. For instance, when a ribbon of several tens of micrometers in thickness having fine crystal nuclei precipitated is produced, a melt at 1300° C. is preferably ejected through a nozzle onto a cooling roll. The atmosphere in the single-roll method is the air or an inert gas (Ar, nitrogen, etc.) when the alloy does not contain active metals, and an inert gas (Ar, He, nitrogen, etc.) or vacuum when it contains active metals. To form a surface oxide film, the melt is quenched preferably in an oxygen-gas-containing atmosphere (for instance, the air).

The peripheral speed of the cooling roll is preferably about 15-50 m/s. Suitable materials for the cooling roll are pure copper or copper alloys such as Cu—Be, Cu—Cr, Cu—Zr, Cu—Zr—Cr, etc. having good thermal conduction. In the mass production, or in the production of thick or wide ribbons, the cooling roll is preferably cooled with water. Because the microstructure of the alloy differs depending on the cooling speed, the roll should have small temperature variation during casting.

(3) Peeling Temperature

The quenched alloy ribbon is stripped from the cooling roll by blowing an inert gas (nitrogen, etc.) from a nozzle into space between the alloy ribbon and the cooling roll. The stripping temperature of the alloy ribbon can be adjusted by changing the position of the nozzle blowing an inert gas (stripping position). The stripping temperature is 170-350° C., preferably 200-340° C., more preferably 250-330° C. When the stripping temperature is lower than 170° C., quenching proceeds to form a substantially amorphous alloy structure, failing to obtain the primary fine-crystalline alloy by the aggregation of Cu, the formation of Cu clusters and the precipitation of fine crystal nuclei. With a proper cooling speed on the roll, a surface region of the ribbon contains Cu decreased by quenching so that fine crystal nuclei are not formed, but more Cu than in the surface region is distributed inside the alloy by a relatively low cooling speed, so that fine crystal nuclei are uniformly formed. As a result, a layer having a higher B concentration (higher ratio of B to Fe) than in the inner matrix phase is formed in the surface region of 30-130 nm in depth. Because of the high-B-concentration, amorphous layer near the surface, the primary fine-crystalline alloy ribbon has good toughness. When the stripping temperature is higher than 350° C., crystallization by Cu proceeds too much, so that the high-B-concentration, amorphous layer is not formed near the surface, failing to obtain sufficient toughness.

Because the inside of the stripped primary fine-crystalline alloy ribbon is still at a relatively high temperature, the primary fine-crystalline alloy ribbon is sufficiently cooled before winding to prevent further crystallization. Specifically, the stripped primary fine-crystalline alloy ribbon is cooled substantially to room temperature by means such as blowing of an inert gas (nitrogen, etc.), and then wound.

(4) Initial Fine-Crystalline Alloy Ribbon

The primary fine-crystalline alloy ribbon has a structure in which fine crystal nuclei having an average diameter of more than 0 nm and 30 nm or less are dispersed in an amorphous phase at a volume fraction of more than 0% and less than 30%. When the average diameter of fine crystal nuclei is more than 30 nm, the fine crystal nuclei become too coarse by the heat treatment, resulting in deteriorated soft magnetic properties. To obtain excellent soft magnetic properties, the average diameter of fine crystal nuclei is preferably 25 nm or less, more preferably 20 nm or less. Because fine crystal nuclei should exist in the amorphous phase, the average diameter of fine crystal nuclei is preferably 0.5 nm or more, more preferably 2 nm or more. The volume fraction of fine crystal nuclei having such average diameter, which are formed in the primary fine-crystalline alloy ribbon, is generally in a range of more than 0% and less than 30%. As the volume fraction of fine crystal nuclei becomes 30% or more, their average diameter tends to be more than 30 nm. If there were no fine crystal nuclei (completely amorphous), coarse crystal grains would be rather formed by the heat treatment. When the volume fraction of fine crystal nuclei is 30% or more, the alloy ribbon does not have sufficient toughness, resulting in difficult handling in the subsequent steps.

The average distance (distance between their centers of gravity) between fine crystal nuclei is preferably 50 nm or less. In this case, the fine crystal nuclei have averaged magnetic anisotropy, resulting in decreased effective crystal magnetic anisotropy. When the average distance between fine crystal nuclei exceeds 50 nm, a magnetic-anisotropy-averaging effect decreases, resulting in higher effective crystal magnetic anisotropy and poorer soft magnetic properties.

The formation of fine crystal nuclei has a close relation to the cooling speed of the alloy. Cu is aggregated by thermal diffusion during a cooling step, forming clusters, which act as fine primary crystal nuclei. Accordingly, there is less thermal diffusion in the surface region with a relatively high cooling speed because of cooling in a short period of time, so that fine crystal nuclei are less formed. As a result, the fine primary crystal phase (matrix phase) is formed beneath the surface oxide film via the amorphous layer.

(5) Heat Treatment

When the primary fine-crystalline alloy ribbon is annealed in an oxygen-containing atmosphere, (a) a matrix phase structure, in which fine crystal grains grown from the fine crystal nuclei to have an average diameter of 60 nm or less are dispersed at a volume fraction of 50% or more, is obtained, and (b) Si and Fe in amounts corresponding to the oxidation are diffused toward the surface to form an oxide film based on Si and Fe (comprising an Si/Fe oxide layer, a high-Fe-concentration oxide layer and a high-Si-concentration oxide layer in this order from the surface) as shown in FIG. 1. The fine crystal grains are based on Fe having a body-centered cubic structure (bcc-Fe), providing the soft magnetic alloy ribbon with increased saturation magnetic flux density and decreased magnetostriction. The oxide film also has a low-B-concentration layer and a low-Cu-concentration layer.

B having positive mixing heat with Fe is also diffused toward the surface, to form a nano-crystalline layer in a surface region, because more Cu is distributed in a surface alloy layer in contact with the oxide film. In a region (depth from the surface: 30-130 nm) beneath the nano-crystalline layer, a high-B-concentration, amorphous layer is formed. The B concentration in the high-B-concentration, amorphous layer is 0.5 atomic % or more higher than in the matrix phase, preferably 1 atomic % or more higher. With the high-B-concentration, amorphous layer, the soft magnetic alloy ribbon has good soft magnetic properties and high toughness.

The formation of nuclei and the growth of crystal grains can be controlled by adjusting three parameters of the temperature-elevating speed, the highest temperature and the heat treatment time. The heat treatment includes a high-temperature, high-speed heat treatment, and a low-temperature, low-speed heat treatment.

(a) High-Temperature, High-Speed Heat Treatment

The high-temperature, high-speed heat treatment provides generally necessary magnetic properties more easily. The heat treatment comprising heating the primary fine-crystalline alloy ribbon to the highest temperature at the maximum temperature-elevating speed of 100° C./minute or more, and keeping it at the highest temperature for 1 hour or less provides a soft magnetic alloy ribbon having a structure comprising fine crystal grains having an average diameter of 60 nm or less, and exhibiting low coercivity, a high magnetic flux density in a low magnetic field, and small hysteresis loss. The average temperature-elevating speed up to the highest temperature is preferably 100° C./minute or more. Because the temperature-elevating speed in a high temperature zone of 300° C. or higher largely affects the magnetic properties of the soft magnetic alloy ribbon, the average temperature-elevating speed at 300° C. or higher is preferably 100° C./minute or more.

The highest temperature in the heat treatment is preferably equal to or higher than $T_{X2}-50°$ C., wherein $T_{X2}$ is the precipitation temperature of compounds, specifically 430° C. or higher. When it is lower than 430° C., the precipitation and growth of fine crystal grains are insufficient. The upper limit of the highest temperature is preferably 500° C. ($T_{X2}$) or lower. Even if a time period of keeping the highest temperature exceeded 1 hour, nano-crystallization would change little, resulting in low productivity. The keeping time is preferably 30 minutes or less, more preferably 20 minutes or less, most preferably 15 minutes or less. Even such high-temperature heat treatment can suppress the growth of crystal grains and the formation of compounds if it is short, resulting in low coercivity, improved magnetic flux density in a low magnetic field, and decreased hysteresis loss.

The formation of crystal nuclei can be controlled by stepwise change of the temperature-elevating speed and the highest temperature. A uniform, fine crystal structure can be obtained by a heat treatment comprising keeping the alloy ribbon at a temperature lower than the crystallization temperature for a sufficient period of time, and keeping it at a temperature equal to or higher than the crystallization temperature for as short time as 1 hour or less. This appears to be due to the fact that crystal grains suppress their growth each other. For instance, it is preferable to keep the alloy ribbon at about 250° C. for more than 1 hour, heating it at a temperature-elevating speed of 100° C./minute or more between 300° C. and 430° C., and then keeping it at the highest temperature of 430° C. to 500° C. for 1 hour or less.

(b) Low-Temperature, Low-Speed Heat Treatment

The primary fine-crystalline alloy ribbon is kept at the highest temperature of about 350° C. or higher and lower than 430° C. for 1 hour or more. From the aspect of mass production, the keeping time is preferably 24 hours or less, more preferably 4 hours or less. To suppress increase in coercivity, the average temperature-elevating speed is preferably 0.1-200° C./minute, more preferably 0.1-100° C./minute. This heat treatment provides soft magnetic alloy ribbons with a high squareness ratio.

(c) Heat Treatment Atmosphere

To form an oxide film having the desired layer structure by diffusing Si, Fe, B and Cu toward the surface, the oxygen concentration in a heat treatment atmosphere is 6-18%, preferably 7-16%, more preferably 8-15%, most preferably 9-13%. The heat treatment atmosphere is preferably a mixed gas of an inert gas such as nitrogen, Ar, helium, etc. and oxygen. When the oxygen concentration in the heat treatment atmosphere is less than 6%, surface oxidation is insufficient, failing to obtain the oxide film having the desired layer structure. On the other hand, when the oxygen concentration in the heat treatment atmosphere is more than 18%, the soft magnetic alloy ribbon has a large curvature (expressed by a radius of curvature). The soft magnetic alloy ribbon is curved due to the difference in a thermal expansion coefficient between the oxide film formed by the heat treatment and the alloy; a thicker oxide film generally providing a larger curvature (a smaller radius of curvature). Accordingly, it may be said that the curvature is a parameter indicating the thickness of the oxide film. The smaller the curvature (the larger the radius of curvature), the flatter the soft magnetic alloy ribbon, and the easier to handle it. On the other hand, the larger the curvature (the smaller the radius of curvature), the more difficult to handle the soft magnetic alloy ribbon, resulting in a lower volume fraction when wound or laminated.

A heat treatment in an atmosphere containing 6-18% of oxygen forms an oxide film having a low-B-concentration layer and a low-Cu-concentration layer in a depth up to about 30 nm from the surface, with a high-B-concentration, amorphous layer in a depth range of about 30-130 nm. Because Si lowering the surface tension tends to be segregated in the ribbon surface, and because Fe is also segregated, the oxide film has relatively low concentrations of B and Cu. The dew point of the heat treatment atmosphere is preferably −30° C. or lower, more preferably −60° C. or lower.

(d) Heat Treatment in a Magnetic Field

The heat treatment in a magnetic field can provide soft magnetic alloy ribbons with induced magnetic anisotropy. To impart good induced magnetic anisotropy, a magnetic field is applied preferably during temperature elevation, at the highest temperature and during cooling. The heat treatment in a magnetic field provides a soft magnetic alloy ribbon with a DC hysteresis loop of a high or low squareness ratio. In the case of a heat treatment without a magnetic field, the resultant soft magnetic alloy ribbon has a DC hysteresis loop of a medium squareness ratio.

The magnetic field is applied preferably for 20 minutes or more at least part of the heat treatment period, which is at a temperature range of 200° C. or higher. The magnetic field should be strong enough to saturate the alloy, and though variable depending on the shape of a ribbon-wound core, it is generally 8 $kAm^{-1}$ or more when applied in a ribbon width direction (a height direction of an annular magnetic core), and 80 $Am^{-1}$ or more when applied in a longitudinal direction (a circumferential direction of an annular magnetic core). The magnetic field may be DC, AC or a pulse.

(6) Surface Treatment

The soft magnetic alloy ribbon of the present invention having an oxide film containing Fe and Si may be coated with oxides such as $SiO_2$, $MgO$, $Al_2O_3$, etc., if necessary. A surface treatment conducted during the heat treatment step increases the bonding strength of the oxide, providing better insulation than an anode oxidation treatment with higher efficiency. If necessary, the magnetic core of a soft magnetic alloy ribbon may be impregnated with a resin.

[3] Magnetic Device

Magnetic devices (wound cores, etc.) constituted by the soft magnetic alloy ribbon of the present invention have high saturation magnetic flux density, suitable for high-power applications that should avoid magnetic saturation, including, for instance, large-current reactors of anode reactors, etc., choke coils for active filters, smoothing choke coils, laser power sources, pulse power magnetic devices used for accelerators, etc., transformers, pulse transformers for communications, magnetic cores of motors and power generators, yokes, current sensors, magnetic sensors, antenna magnetic cores, electromagnetic wave absorption sheets, etc.

The present invention will be described in more detail with reference to Examples below without intention of restricting the scope of this invention.

Example 1

Alloy melts having the compositions shown in Table 1 were quenched by a single-roll method in the air to obtain primary fine-crystalline alloy ribbons of 5 mm in width and 16-25 μm in thickness each having a structure comprising fine crystal nuclei having an average diameter of 30 nm or less dispersed at a volume fraction of 2-25% in an amorphous phase, with varied stripping temperatures from the roll surface. The stripping temperature of each primary fine-crystalline alloy ribbon was measured by the method described below.

Each primary fine-crystalline alloy ribbon was placed in a furnace with a nitrogen atmosphere having an oxygen concentration of 10%, and subject to a nano-crystallization heat treatment under the conditions of heating at 120° C./minute on average, and keeping the highest temperature of 450° C. for 5 minutes. The resultant soft magnetic alloy ribbon was measured with respect to the average diameter and volume fraction of fine crystal grains by the method described below. It was thus found that each soft magnetic alloy ribbon had a structure in which fine crystal grains having an average diameter of 60 nm or less were dispersed at a volume fraction of 50% or more in an amorphous phase.

With respect to each soft magnetic alloy ribbon, the depth and the maximum B concentration (atomic %) of the high-B-concentration, amorphous layer, and the B concentration (atomic %) of the matrix phase were measured by the methods described below. The B concentration of the matrix phase is expressed by an average value. Also, the core loss ($P_{10/1k}$) and corrosion resistance of each soft magnetic alloy ribbon were measured by the methods described below.

The measurement results are shown in Table 1 together with the alloy compositions.

(1) Measurement of Stripping Temperature

The temperature of the primary fine-crystalline alloy ribbon, which was stripped from a cooling roll by a nitrogen gas blown from a nozzle at a stripping position, was measured by a radiation thermometer (FSV-7000E available from Apiste), and defined as a stripping temperature.

(2) Measurement of Average Diameter and Volume Fraction of Fine Crystal Grains

The average diameter of fine crystal grains was measured on a TEM photograph of each sample. Also, an arbitrary straight line of length Lt was drawn on the TEM photograph of each sample to measure the total length Lc of its portions crossing fine crystal grains, thereby calculating Lc/Lt. Repeating this operation plural times, the averaged Lc/Lt was used as the volume fraction of fine crystal grains.

(3) Measurement of Element Concentration

The concentration distribution of each element from a free surface (surface without contact with the cooling roll) toward the inside was measured by glow discharge optical emission spectroscopy (GDOES), using GD-Profiler 2 available from Horiba, Ltd.

(4) Measurement of Core Loss

Although good insulation between alloy ribbons provides $P_{10/1k}$ of less than 10 W/kg, the core loss would exceed this value if there were eddy current loss in the ribbons because of poor insulation between them. Accordingly, a sinusoidal wave was input to each soft magnetic alloy ribbon sample of 120 mm×5 mm under the conditions of 1 T and 1 kHz by an AC magnetometer (TWM-18SR available from Toei-Kogyo Co., Ltd.), and a waveform signal detected by a secondary coil was analyzed. Because eddy current loss is proportional to the square of a frequency, it largely changes depending on insulation between ribbons at high frequencies. The insulation is determined as good when $P_{10/1k}<10$ W/kg, and as a permissible lower limit when $10 \leq P_{10/1k} < 20$ W/kg.

(5) Measurement of Corrosion Resistance

Each soft magnetic alloy ribbon sample was immersed in tapped water for 5 hours, to evaluate corrosion resistance by the amount of surface rust by the following standard.

Excellent There was slight rust, though it did not cover the entire sample surface.

Good There was thin rust on the entire sample surface, though it was removed by rubbing with a cloth.

Fair There was rust on the entire sample surface, though it was removed by a grinder, indicating that it did not penetrate into the sample (permissible lower limit).

Poor Rust on the entire surface penetrated into the sample.

Comparative Example 1

Initial fine-crystalline alloy ribbons of 5 mm in width and 16-25 μm in thickness were produced from alloy melts having compositions shown in Table 2, in the same manner as in Example 1 except for changing the stripping temperature to lower than 170° C. or higher than 350° C. Each primary fine-crystalline alloy ribbon had a structure in which fine crystal nuclei having an average diameter of 30 nm or less were dispersed at a volume fraction of about 2-25% in an amorphous phase. Each primary fine-crystalline alloy ribbon was annealed under the same conditions as in Example 1 to produce a soft magnetic alloy ribbon. Each soft magnetic alloy ribbon had a structure in which fine crystal grains having an average diameter of 60 nm or less were dispersed at a volume fraction of 50% or more in an amorphous phase. The same measurements as in Example 1 were conducted on each soft magnetic alloy ribbon. The measurement results are shown in Table 2 together with the alloy compositions.

TABLE 1

| Sample | Composition | Peeling Temperature (° C.) | High-B-Concentration, Amorphous Layer | |
|---|---|---|---|---|
| | | | Depth From Surface (nm) | Highest B Concentration (atomic %) |
| 1-1 | $Fe_{bal.}Cu_{1.6}Si_9B_{11}$ | 320 | 55 | 14.7 |
| 1-2 | $Fe_{bal.}Cu_{1.5}Si_4B_{12}$ | 300 | 75 | 15.5 |
| 1-3 | $Fe_{bal.}Cu_{1.6}Si_8B_{12}$ | 320 | 75 | 16.3 |
| 1-4 | $Fe_{bal.}Cu_{1.35}Si_3B_{13}$ | 290 | 50 | 16.0 |
| 1-5 | $Fe_{bal.}Cu_{1.6}Si_9B_{13}$ | 330 | 65 | 18.3 |
| 1-6 | $Fe_{bal.}Cu_{1.35}Si_2B_{14}$ | 280 | 65 | 17.9 |
| 1-7 | $Fe_{bal.}Cu_{1.35}Si_3B_{14}$ | 280 | 70 | 18.0 |

TABLE 1-continued

| Sample | Composition | | | |
|---|---|---|---|---|
| 1-8 | $Fe_{bal.}Cu_{1.5}Si_4B_{14}$ | 290 | 85 | 18.1 |
| 1-9 | $Fe_{bal.}Cu_{1.5}Si_6B_{14}$ | 290 | 80 | 17.4 |
| 1-10 | $Fe_{bal.}Cu_{1.35}Si_2B_{15}$ | 270 | 75 | 18.3 |
| 1-11 | $Fe_{bal.}Cu_{1.6}Si_6B_{15}$ | 290 | 60 | 16.7 |
| 1-12 | $Fe_{bal.}Cu_{1.5}Si_2B_{16}$ | 270 | 55 | 18.8 |
| 1-13 | $Fe_{bal.}Cu_{1.6}Si_5B_{16}$ | 280 | 55 | 18.5 |
| 1-14 | $Fe_{bal.}Cu_{1.5}Si_2B_{18}$ | 340 | 50 | 20.0 |
| 1-15 | $Fe_{bal.}Cu_{1.6}Si_2B_{20}$ | 345 | 75 | 22.3 |
| 1-16 | $Fe_{bal.}Au_{1.6}Si_9B_{11}$ | 320 | 80 | 14.7 |
| 1-17 | $Fe_{bal.}Cu_{1.35}Si_2B_{16}$ | 170 | 130 | 17.7 |
| 1-18 | $Fe_{bal.}Cu_{1.3}Si_5B_{11}$ | 250 | 105 | 13.6 |

| Sample | Average B Concentration (atomic %) in Matrix Phase | Core Loss $P_{10/1k}$ (W/kg) | Corrosion Resistance |
|---|---|---|---|
| 1-1 | 12.1 | 5.3 | Excellent |
| 1-2 | 12.7 | 5.5 | Excellent |
| 1-3 | 13.5 | 6.7 | Excellent |
| 1-4 | 13.5 | 6.0 | Excellent |
| 1-5 | 14.5 | 7.2 | Excellent |
| 1-6 | 14.5 | 5.3 | Excellent |
| 1-7 | 14.6 | 5.1 | Excellent |
| 1-8 | 14.8 | 5.7 | Excellent |
| 1-9 | 15.2 | 6.3 | Excellent |
| 1-10 | 15.2 | 5.6 | Excellent |
| 1-11 | 15.5 | 7.3 | Excellent |
| 1-12 | 16.2 | 6.8 | Excellent |
| 1-13 | 16.3 | 6.8 | Excellent |
| 1-14 | 18.3 | 6.5 | Excellent |
| 1-15 | 20.5 | 7.8 | Excellent |
| 1-16 | 12.1 | 6.6 | Excellent |
| 1-17 | 16.2 | 6.5 | Excellent |
| 1-18 | 11.5 | 6.8 | Excellent |

TABLE 2

| | | High-B-Concentration, Amorphous Layer | | |
|---|---|---|---|---|
| Sample | Composition | Peeling Temperature (° C.) | Depth From Surface (nm) | Highest B Concentration (atomic %) |
| 2-1 | $Fe_{bal.}Cu_{1.35}Si_4B_{12}$ | 140 | 150 | 12.3 |
| 2-2 | $Fe_{bal.}Cu_{1.6}Si_9B_{13}$ | 355 | 75 | 14.5 |
| 2-3 | $Fe_{bal.}Cu_{1.35}Si_2B_{14}$ | 140 | 80 | 14.2 |
| 2-4 | $Fe_{bal.}Cu_{1.6}Si_6B_{15}$ | 355 | 65 | 15.7 |
| 2-5 | $Fe_{bal.}Cu_{1.6}Si_5B_{16}$ | 360 | 85 | 17.0 |
| 2-6 | $Fe_{bal.}Cu_{1.5}Si_2B_{18}$ | 355 | 75 | 18.9 |
| 2-7 | $Fe_{bal.}Cu_{1.6}Si_2B_{20}$ | 360 | 50 | 20.4 |
| 2-8 | $Fe_{bal.}Cu_{1.6}Si_7B_{13}$ | 360 | 25 | 14.0 |
| 2-9 | $Fe_{bal.}Cu_{1.2}Si_4B_{15}$ | 160 | 140 | 15.1 |
| 2-10 | $Fe_{bal.}Cu_{1.3}Si_5B_{11}$ | 150 | 150 | 11.2 |
| 2-11 | $Fe_{bal.}Cu_{1.35}Si_3B_{13}$ | 130 | 65 | 13.2 |

| Sample | Average B Concentration (atomic %) in Matrix Phase | Core Loss $P_{10/1k}$ (W/kg) | Corrosion Resistance |
|---|---|---|---|
| 2-1 | 12.3 | 12 | Fair |
| 2-2 | 14.3 | 18 | Fair |
| 2-3 | 14.1 | 15 | Fair |
| 2-4 | 15.5 | 12 | Fair |
| 2-5 | 16.6 | 14 | Fair |
| 2-6 | 18.5 | 14 | Fair |
| 2-7 | 20.2 | 15 | Fair |
| 2-8 | 13.5 | 12 | Fair |
| 2-9 | 15.1 | 10 | Fair |
| 2-10 | 11.1 | 10 | Fair |
| 2-11 | 13.1 | 15 | Fair |

It is clear from Tables 1 and 2 that the soft magnetic alloy ribbons had different surface region structures depending on the stripping temperature. At the stripping temperatures of 170-350° C., the B concentrations of the high-B-concentration, amorphous layers were clearly higher than those of the matrix phases (having substantially the same alloy compositions), the differences between the maximum B concentrations and the average B concentrations being 1.2-3.8 atomic % (average 2.5 atomic %), more than 0.5 atomic %. On the other hand, at stripping temperatures outside the range of 170-350° C., the differences between the maximum B concentrations and the average B concentrations were as small as less than 0.5 atomic % (average 0.3 atomic %).

The core loss was as small as less than 10 W/kg at the stripping temperatures of 170-350° C., while it was large at stripping temperatures outside the range of 170-350° C. This means that eddy current was suppressed in the soft magnetic alloy ribbons of the present invention because of the formation of oxide films having excellent insulation.

With respect to the soft magnetic alloy ribbons of Example 1 and Comparative Example 1, the concentration distribution of Cu was examined by GDOES. The depth of the low-Cu-concentration layer from the surface shown in FIG. 1, the minimum Cu concentration (atomic %) in the low-Cu-concentration layer, the average Cu concentration (atomic %) in the matrix phase, and the surface Cu concentration (atomic %) were measured. The low-Cu-concentration layer substantially corresponds to the high-Si-concentration oxide layer in the oxide film. The results are shown in Tables 3 and 4.

TABLE 3

| | | | Low-Cu-Concentration Layer | |
|---|---|---|---|---|
| Sample | Composition | Peeling Temperature (° C.) | Depth From Surface (nm) | Minimum Cu Concentration (atomic %) |
| 1-1 | $Fe_{bal.}Cu_{1.6}Si_9B_{11}$ | 320 | 10 | 0.3 |
| 1-2 | $Fe_{bal.}Cu_{1.5}Si_4B_{12}$ | 300 | 10 | 0.2 |
| 1-3 | $Fe_{bal.}Cu_{1.6}Si_8B_{12}$ | 320 | 10 | 0.4 |
| 1-4 | $Fe_{bal.}Cu_{1.35}Si_3B_{13}$ | 290 | 10 | 0.3 |
| 1-5 | $Fe_{bal.}Cu_{1.6}Si_9B_{13}$ | 330 | 10 | 0.3 |
| 1-6 | $Fe_{bal.}Cu_{1.35}Si_2B_{14}$ | 280 | 10 | 0.2 |
| 1-7 | $Fe_{bal.}Cu_{1.35}Si_3B_{14}$ | 280 | 10 | 0.5 |
| 1-8 | $Fe_{bal.}Cu_{1.5}Si_4B_{14}$ | 290 | 10 | 0.4 |
| 1-9 | $Fe_{bal.}Cu_{1.5}Si_6B_{14}$ | 290 | 10 | 0.3 |
| 1-10 | $Fe_{bal.}Cu_{1.35}Si_2B_{15}$ | 270 | 10 | 0.4 |
| 1-11 | $Fe_{bal.}Cu_{1.6}Si_6B_{15}$ | 290 | 10 | 0.5 |
| 1-12 | $Fe_{bal.}Cu_{1.5}Si_2B_{16}$ | 270 | 10 | 0.2 |
| 1-13 | $Fe_{bal.}Cu_{1.6}Si_5B_{16}$ | 280 | 10 | 0.1 |
| 1-14 | $Fe_{bal.}Cu_{1.5}Si_2B_{18}$ | 340 | 10 | 0.3 |
| 1-15 | $Fe_{bal.}Cu_{1.6}Si_2B_{20}$ | 345 | 10 | 0.2 |
| 1-16 | $Fe_{bal.}Au_{1.6}Si_9B_{11}$ | 320 | 10 | 0.3 |
| 1-17 | $Fe_{bal.}Cu_{1.35}Si_2B_{16}$ | 170 | 20 | 0.4 |
| 1-18 | $Fe_{bal.}Cu_{1.3}Si_5B_{11}$ | 250 | 25 | 0.2 |

| Sample | Average Cu Concentration (atomic %) in Matrix Phase | Surface Cu Concentration (atomic %) |
|---|---|---|
| 1-1 | 1.48 | 2.3 |
| 1-2 | 1.45 | 1.3 |
| 1-3 | 1.5 | 2.5 |
| 1-4 | 1.32 | 2.0 |
| 1-5 | 1.49 | 1.3 |
| 1-6 | 1.33 | 1.8 |
| 1-7 | 1.33 | 1.6 |
| 1-8 | 1.48 | 2.4 |
| 1-9 | 1.47 | 2.4 |
| 1-10 | 1.34 | 1.9 |
| 1-11 | 1.48 | 1.2 |
| 1-12 | 1.49 | 1.3 |
| 1-13 | 1.45 | 1.6 |
| 1-14 | 1.46 | 1.8 |
| 1-15 | 1.47 | 1.9 |
| 1-16 | 1.49 | 1.5 |
| 1-17 | 1.33 | 1.9 |
| 1-18 | 1.34 | 1.8 |

TABLE 4

| Sample | Composition | Low-Cu-Concentration Layer | | |
|---|---|---|---|---|
| | | Peeling Temperature (°C.) | Depth From Surface (nm) | Minimum Cu Concentration (atomic %) |
| 2-1 | $Fe_{bal.}Cu_{1.35}Si_4B_{12}$ | 140 | 10 | 0.8 |
| 2-2 | $Fe_{bal.}Cu_{1.6}Si_9B_{13}$ | 355 | 55 | 0.3 |
| 2-4 | $Fe_{bal.}Cu_{1.6}Si_6B_{15}$ | 355 | 50 | 1.1 |
| 2-5 | $Fe_{bal.}Cu_{1.6}Si_5B_{16}$ | 360 | 20 | 1.2 |
| 2-8 | $Fe_{bal.}Cu_{1.6}Si_7B_{13}$ | 360 | 40 | 1.2 |
| 2-9 | $Fe_{bal.}Cu_{1.2}Si_4B_{15}$ | 160 | 55 | 0.2 |
| 2-10 | $Fe_{bal.}Cu_{1.3}Si_5B_{11}$ | 150 | 20 | 0.7 |

| Sample | Average Cu Concentration (atomic %) in Matrix Phase | Surface Cu Concentration (atomic %) |
|---|---|---|
| 2-1 | 1.33 | 1.0 |
| 2-2 | 1.61 | 1.0 |
| 2-4 | 1.61 | 1.2 |
| 2-5 | 1.59 | 1.3 |
| 2-8 | 1.58 | 1.3 |
| 2-9 | 1.21 | 0.5 |
| 2-10 | 1.31 | 1.0 |

As is clear from Tables 3 and 4, when the stripping temperature was 170-350° C., a low-Cu-concentration layer was formed in a depth of 10-25 nm, and the minimum Cu concentration in the low-Cu-concentration layer was less than 50% of the average Cu concentration in the matrix phase. On the other hand, when the stripping temperatures was outside the range of 170-350° C., the low-Cu-concentration layer was likely formed as deep as 50 nm or more, and the minimum Cu concentration in the low-Cu-concentration layer was likely 50% or more of the average Cu concentration in the matrix phase.

Figure 2A:
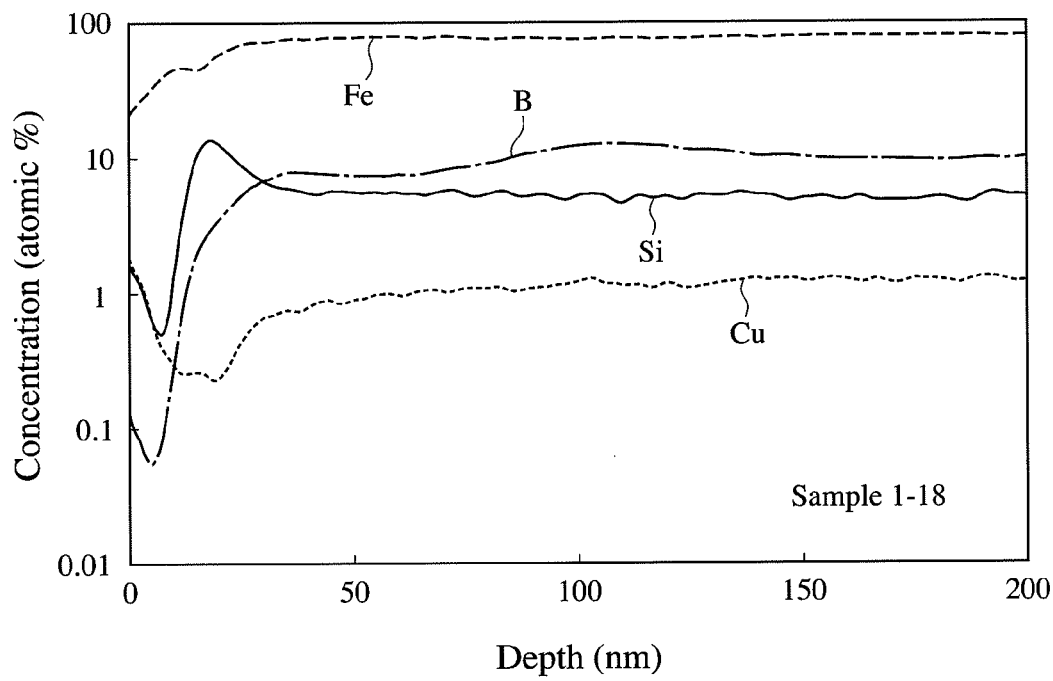
FIG. 2(a) is a graph showing the relation between the concentration distributions of Fe, B, Si and Cu and depth, in the soft magnetic alloy ribbon (Sample 1-18) of Example 1 having a composition of $Fe_{bal.}Cu_{1.3}Si_5B_{11}$.
Figure 2B:
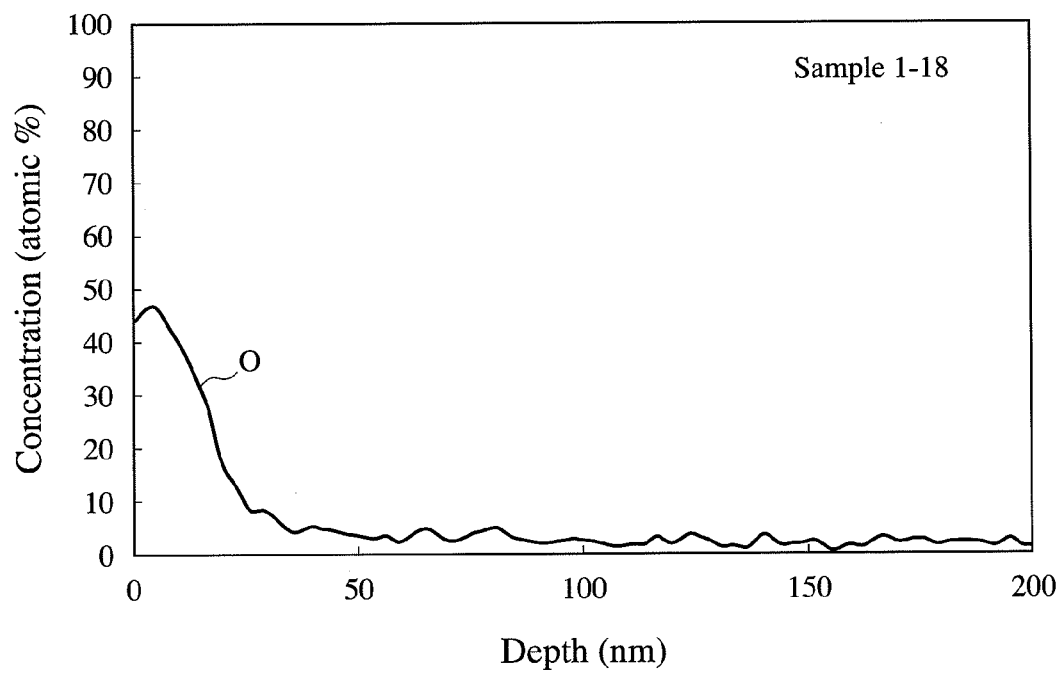
FIG. 2(b) is a graph showing the relation between the concentration distribution of O and depth, in the soft magnetic alloy ribbon (Sample 1-18) of Example 1 having a composition of $Fe_{bal.}Cu_{1.3}Si_5B_{11}$.
Figure 3A:
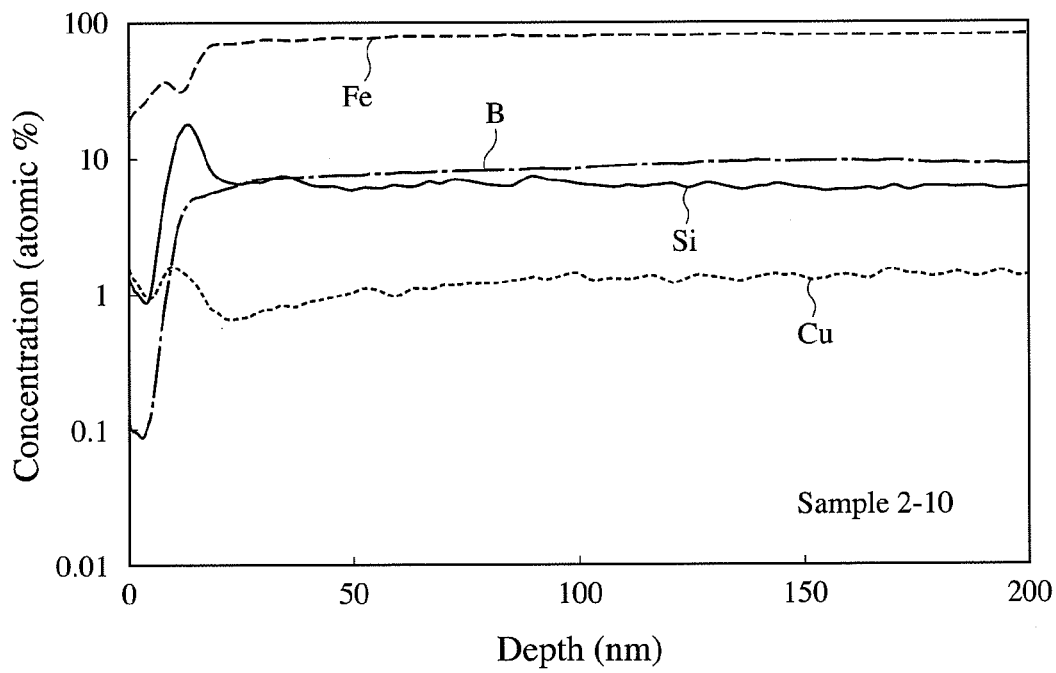
FIG. 3(a) is a graph showing the relation between the concentration distributions of Fe, B, Si and Cu and depth, in the soft magnetic alloy ribbon (Sample 2-10) of Comparative Example 1 having a composition of $Fe_{bal.}Cu_{1.3}Si_5B_{11}$.
Figure 3B:
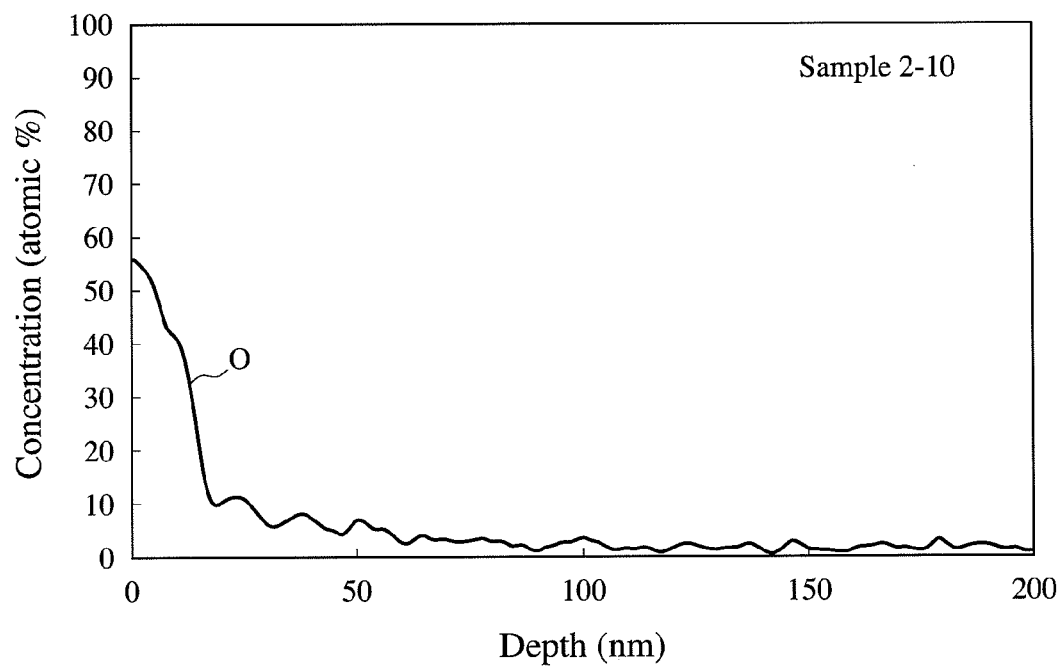
FIG. 3(b) is a graph showing the relation between the concentration distribution of O and depth, in the soft magnetic alloy ribbon (Sample 2-10) of Comparative Example 1 having a composition of $Fe_{bal.}Cu_{1.3}Si_5B_{11}$.

With respect to the soft magnetic alloy ribbon of $Fe_{bal.}Cu_{1.3}Si_5B_{11}$ (Sample 1-18) formed at the stripping temperature of 250° C., the concentration distributions of Fe, B, Cu, Si and O from the free surface toward inside were measured by GDOES. The results are shown in FIGS. 2(a) and 2(b). For comparison, with respect to the soft magnetic alloy ribbon of $Fe_{bal.}Cu_{1.3}Si_5B_{11}$ (Sample 2-10) formed at the stripping temperature of 150° C., too, the concentration distributions of Fe, B, Cu, Si and O were measured by GDOES. The results are shown in FIGS. 3(a) and 3(b). In FIGS. 2 and 3, the axis of ordinates indicates the concentration (atomic %) of each element, and the axis of abscissas indicates the depth from the surface. The depth of 0 nm corresponds to the alloy ribbon surface.

In Sample 1-18, there was an oxide film in a depth up to about 30 nm in which the O concentration was high. The B concentration was minimum in the oxide film, and maximum near 100 nm. The concentration of Cu was minimum near 30 nm. The transmission electron photomicrograph (TEM photograph) of FIG. 1 revealed that an oxide film, a nano-crystalline layer, a high-B-concentration, amorphous layer with the highest B concentration and a nano-crystalline matrix phase were formed in this order from the surface. there was a minimum-Cu-concentration region near a boundary between the oxide film and the nano-crystalline layer.

Sample 2-10 appears to have an oxide film in a depth up to 30 nm, with no remarkable B segregation in a deeper region. The concentration of Cu was minimum near 20 nm, though its minimum level was not so lower than the average Cu concentration of the matrix phase. It was found from the TEM photograph that Sample 2-10 did not have a clear layer structure unlike Sample 1-18, suggesting that Sample 2-10 had poor insulation and corrosion resistance.

Figure 4A:
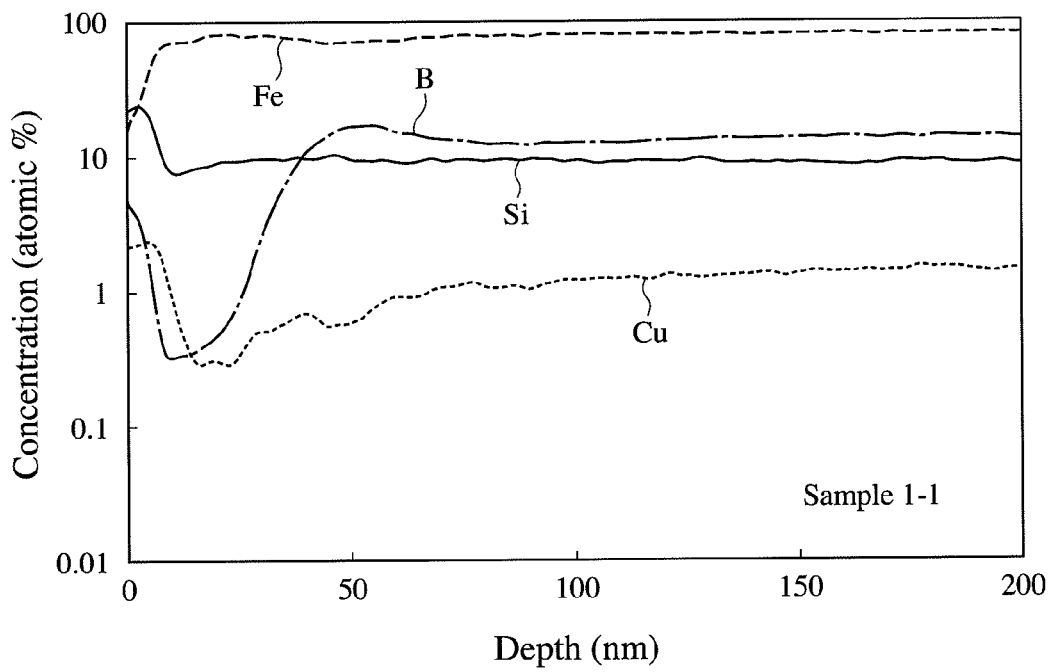
FIG. 4(a) is a graph showing the relation between the concentration distributions of Fe, B, Si and Cu and depth, in the soft magnetic alloy ribbon (Sample 1-1) of Example 1 having a composition of $Fe_{bal.}Cu_{1.6}Si_9B_{11}$.
Figure 4B:
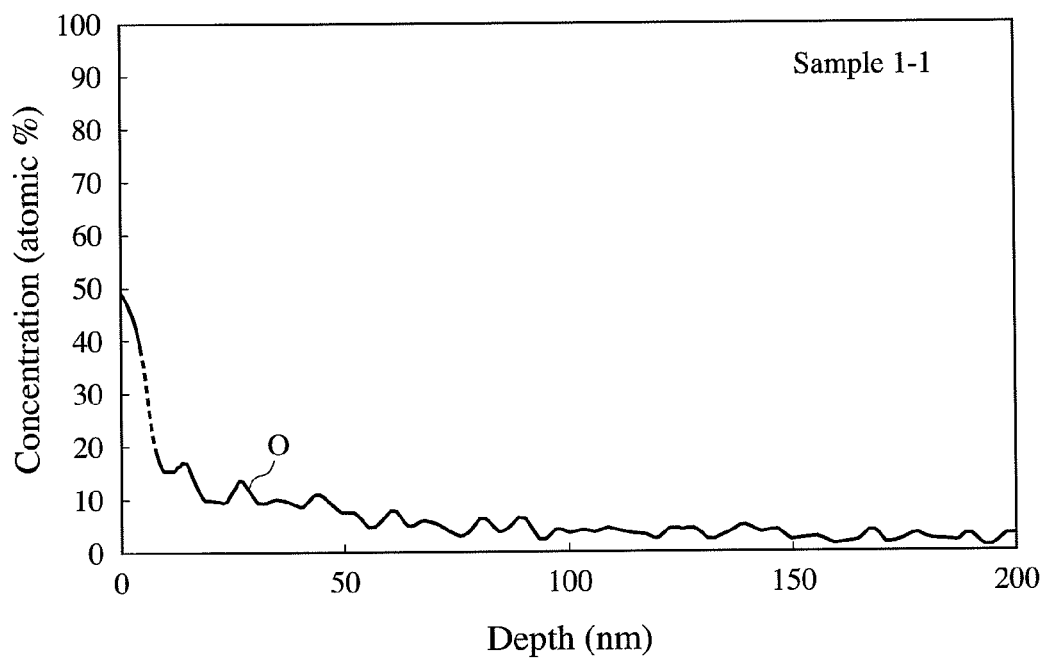
FIG. 4(b) is a graph showing the relation between the concentration distribution of O and depth, in the soft magnetic alloy ribbon (Sample 1-1) of Example 1 having a composition of $Fe_{bal.}Cu_{1.6}Si_9B_{11}$.

With respect to the soft magnetic alloy ribbon of $Fe_{bal.}Cu_{1.6}Si_9B_{11}$ (Sample 1-1) formed at a stripping temperature of 320° C., the concentration distributions of Fe, B, Cu, Si and O from the free surface toward inside were measured by GDOES. The measurement results are shown in FIGS. 4(a) and 4(b). The concentration of B was minimum near 10 nm from the surface, and maximum near 60 nm. The concentration of Cu was minimum near 20 nm. It was found from the TEM photograph that like Sample 1-18, Sample 1-1 had an oxide film, a nano-crystalline layer, a high-B-concentration, amorphous layer and a nano-crystalline matrix phase in this order from the surface.

Example 2

Figure 5A:
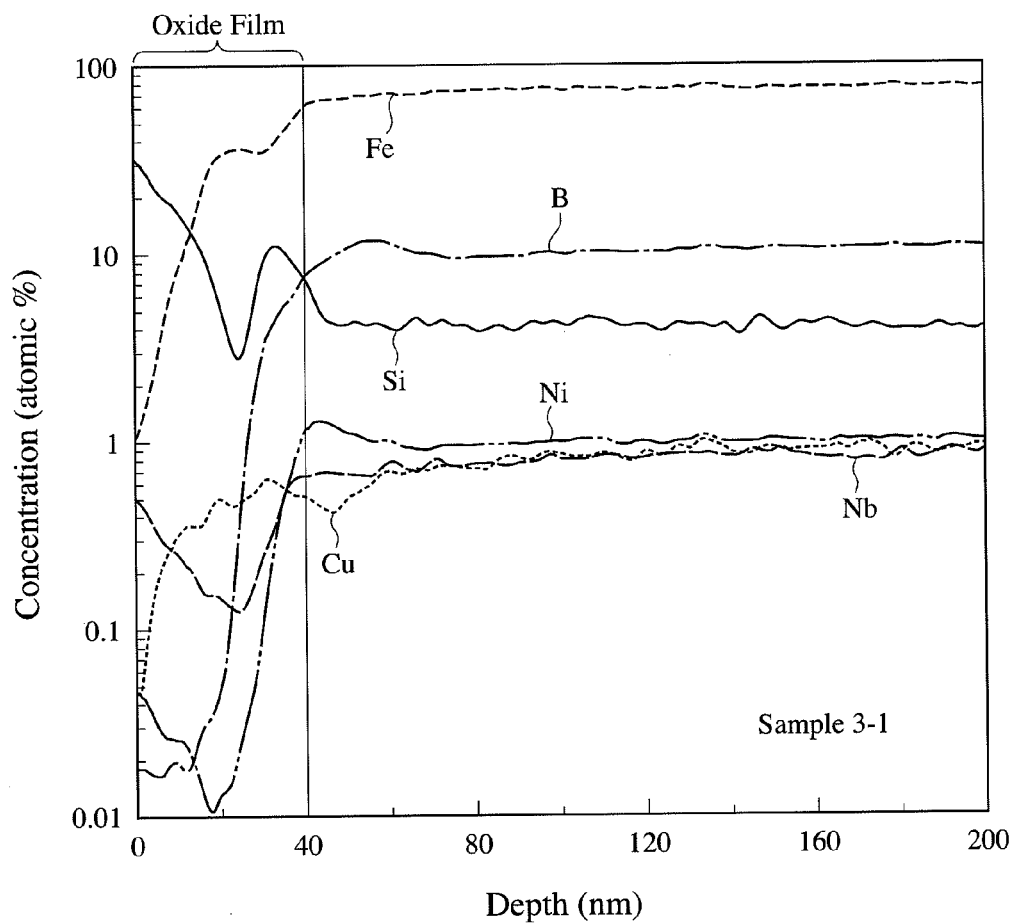
FIG. 5(a) is a graph showing the relation between the concentration distributions of Fe, B, Si, Cu, Nb and Ni and depth, in the soft magnetic alloy ribbon (Sample 3-1) of Example 2 having a composition of $Fe_{bal.}Cu_1Ni_1Nb_1Si_4B_{12}$.
Figure 5B:
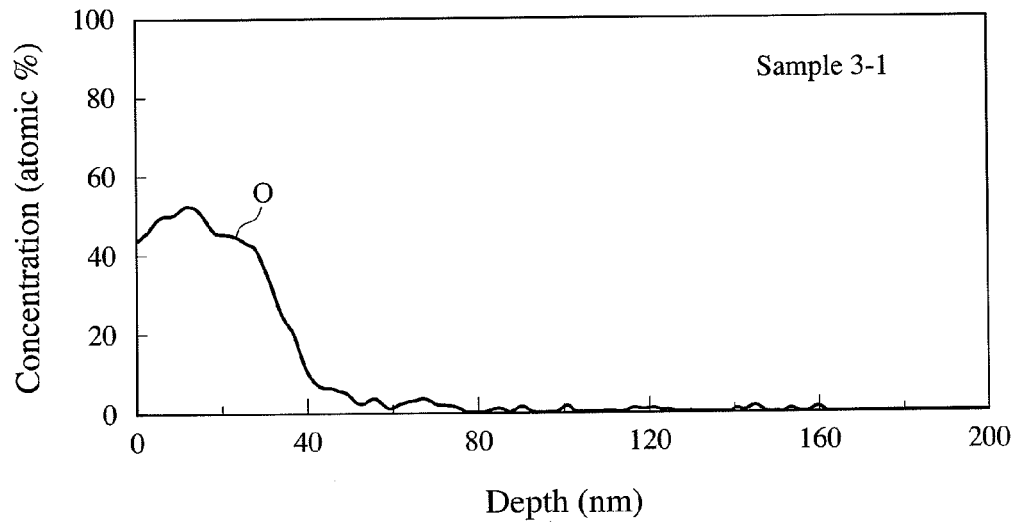
FIG. 5(b) is a graph showing the relation between the concentration distribution of O and depth, in the soft magnetic alloy ribbon (Sample 3-1) of Example 2 having a composition of $Fe_{bal.}Cu_1Ni_1Nb_1Si_4B_{12}$.
Figure 6A:
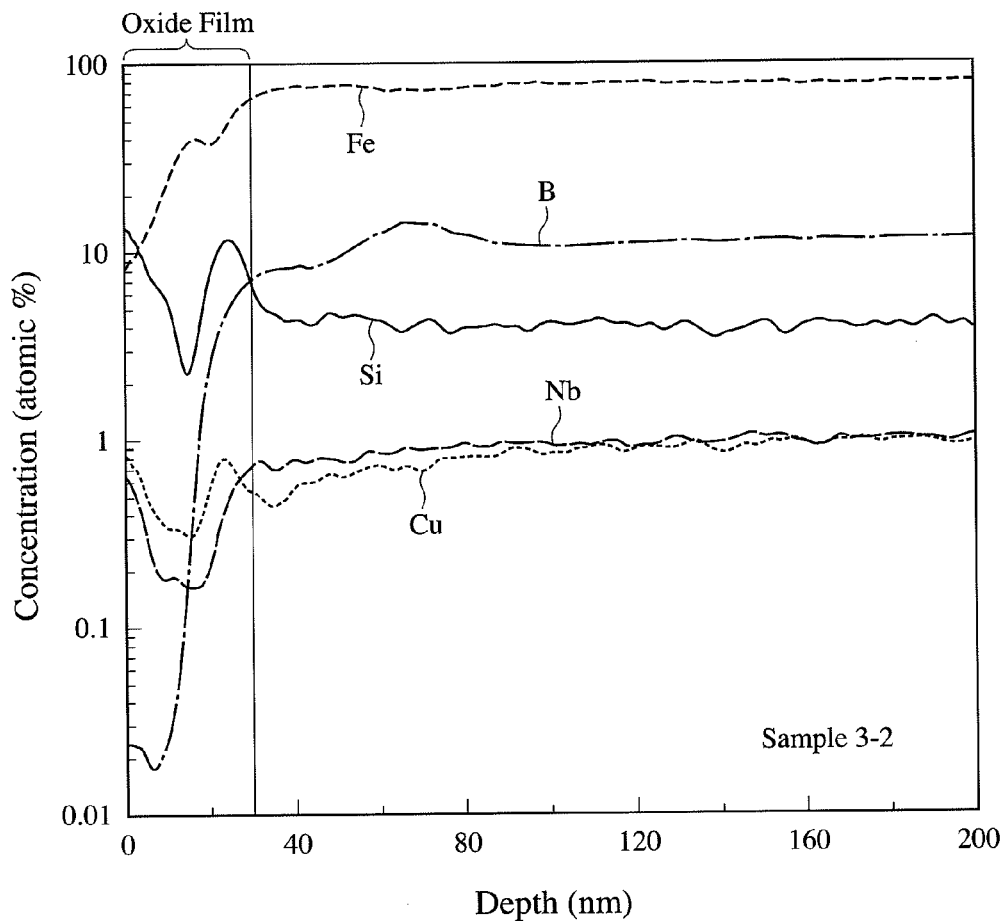
FIG. 6(a) is a graph showing the relation between the concentration distributions of Fe, B, Si, Cu and Nb and depth, in the soft magnetic alloy ribbon (Sample 3-2) of Example 2 having a composition of $Fe_{bal.}Cu_1Nb_1Si_4B_{12}$.
Figure 6B:
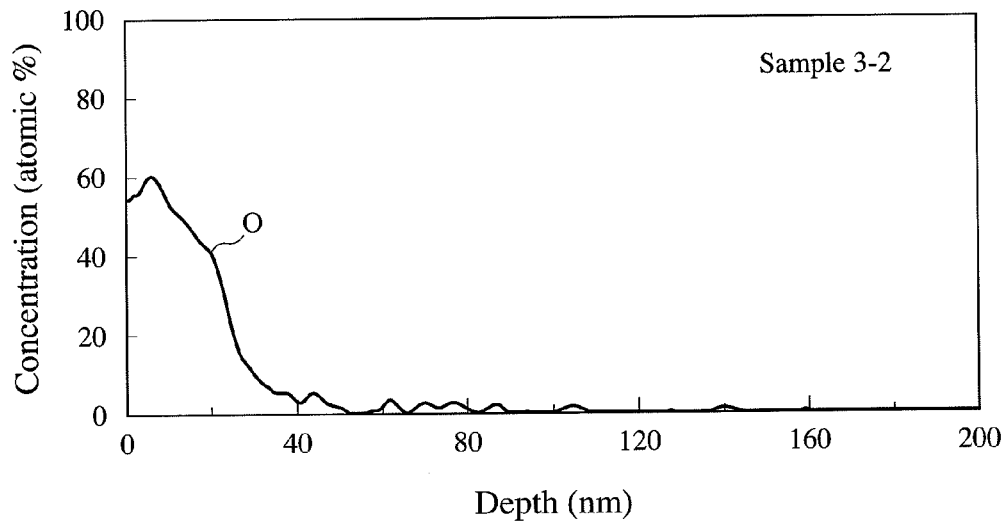
FIG. 6(b) is a graph showing the relation between the concentration distribution of O and depth, in the soft magnetic alloy ribbon (Sample 3-2) of Example 2 having a composition of $Fe_{bal.}Cu_1Nb_1Si_4B_{12}$.

Soft magnetic alloy ribbons each having a structure, in which fine crystal grains having an average diameter of 60 nm or less were dispersed at a volume fraction of 50% or more in an amorphous phase, were produced from an alloy melt of $Fe_{bal.}Ni_1Cu_1Nb_1Si_4B_{12}$ (Sample 3-1), and an alloy melt having the same composition of $Fe_{bal.}Cu_1Nb_1Si_4B_{12}$ except for containing no Ni (Sample 3-2), in the same manner as in Example 1 except for changing the stripping temperature to 300° C. The concentration distributions of Fe, Ni, B, Si, Cu, Nb and O from the free surface toward inside in each ribbon were measured by GDOES. The measurement results of Sample 3-1 are shown in FIG. 5, and the measurement results of Sample 3-2 are shown in FIG. 6. In FIGS. 5 and 6, the origin corresponds to the sample surface.

Sample 3-1 had a boundary between the oxide film and the nano-crystalline layer near 40 nm, and there was a high-B-concentration, amorphous layer having the highest B concentration near the nano-crystalline layer. The concentration of Cu was minimum at the ribbon surface. In Sample 3-2, too, the highest B concentration was observed near 70 nm, and the lowest Cu concentration was observed near 20 nm. It was found from the TEM photograph that each of the alloy ribbons had an oxide film, a nano-crystalline layer, a high-B-concentration, amorphous layer with the highest B concentration, and a nano-crystalline matrix phase in this order from the surface. There was a high-B-concentration, amorphous layer nearer the surface in Sample 3-1 containing Ni than in Sample 3-2 containing no Ni. Both soft magnetic alloy ribbons are within the range of the present invention, but because Sample 3-1 containing Ni had more oxide film having high insulation and corrosion resistance and more amorphous layer having high toughness, as well as more volume fraction of a matrix phase contributing to soft magnetic properties, than Sample 3-2 containing no Ni, Sample 3-1 had higher permeability and lower coercivity.

Example 3

Soft magnetic alloy ribbons each having a structure, in which fine crystal grains having an average diameter of 60 nm or less were dispersed in an amorphous phase at a volume fraction of 50% or more, were produced from alloy melts having the compositions shown in Table 5, in the same manner as in Example 1 except for changing the stripping temperature to 300° C. The depth at the highest B concentration was measured on each soft magnetic alloy ribbon. Also, core loss ($P_{10/1k}$) at 1 T and 1 kHz was measured on a wound core formed by each soft magnetic alloy ribbon. The results are shown in Table 5.

TABLE 5

| Sample | Composition | Depth (nm) at Highest B Concentration | Core Loss $P_{10/1k}$ (W/kg) |
|---|---|---|---|
| 4-1 | $Fe_{bal.}Ni_1Cu_1Nb_1Si_4B_{12}$ | 55 | 4.1 |
| 4-2 | $Fe_{bal.}Mn_1Cu_1Nb_1Si_4B_{12}$ | 35 | 4.0 |
| 4-3 | $Fe_{bal.}Co_1Cu_1Nb_1Si_4B_{12}$ | 50 | 4.0 |
| 4-4 | $Fe_{bal.}V_1Cu_1Nb_1Si_4B_{12}$ | 50 | 4.3 |
| 4-5 | $Fe_{bal.}Cr_1Cu_1Nb_1Si_4B_{12}$ | 45 | 4.1 |
| 4-6 | $Fe_{bal.}Cu_1Nb_1Si_4B_{12}$ | 80 | 4.4 |

As is clear from Table 5, the high-B-concentration, amorphous layers were as deep as 30-100 nm. Also, these soft magnetic alloy ribbons had core loss ($P_{10/1k}$) suppressed to less than 5 W/kg.

Example 4

Initial fine-crystalline alloy ribbons of 5 mm in width and 20-25 μm in thickness each having a structure, in which fine crystal nuclei having an average diameter of 30 nm or less were dispersed in an amorphous phase at a volume fraction of 6-25%, were produced from Fe—Cu—Nb—Si—B alloy melts having the compositions shown in Table 6, in the same manner as in Example 1 except for changing the ribbon temperature to 300° C. The primary fine-crystalline alloy ribbons were subject to a heat treatment under the conditions that an average temperature-elevating speed was 110° C./minute, and that the highest temperature was 430° C., to obtain soft magnetic alloy ribbons each having a structure, in which fine crystal grains having an average diameter of 60 nm or less were dispersed at a volume fraction of 50% or more in an amorphous phase. Each soft magnetic alloy ribbon was measured with respect to the depth of a high-B-concentration, amorphous layer from the surface, the maximum concentration of B, the average B concentration of a matrix phase, core loss and corrosion resistance, by the same methods as in Example 1. The results are shown in Table 6.

TABLE 6

| Sample | Composition | Peeling Temperature (° C.) | High-B-Concentration, Amorphous Layer | |
|---|---|---|---|---|
| | | | Depth From Surface (nm) | Highest B concentration (atomic %) |
| 5-1 | $Fe_{bal.}Cu_1Nb_{0.3}Si_4B_{12}$ | 300 | 60 | 12.8 |
| 5-2 | $Fe_{bal.}Cu_1Nb_{0.8}Si_4B_{12}$ | 300 | 50 | 12.9 |
| 5-3 | $Fe_{bal.}Cu_1Nb_{1.3}Si_4B_{12}$ | 300 | 50 | 13.1 |
| 5-4 | $Fe_{bal.}Cu_1Nb_{2.0}Si_4B_{12}$ | 300 | 60 | 12.7 |
| 5-5 | $Fe_{bal.}Cu_1Nb_{2.5}Si_4B_{12}$ | 300 | 60 | 12.8 |
| 5-6 | $Fe_{bal.}Cu_1Ta_1Si_4B_{12}$ | 300 | 70 | 12.9 |
| 5-7 | $Fe_{bal.}Cu_1Zr_1Si_4B_{12}$ | 300 | 40 | 12.9 |
| 5-8 | $Fe_{bal.}Cu_1Mo_1Si_4B_{12}$ | 300 | 80 | 13.0 |
| 5-9 | $Fe_{bal.}Cu_1Hf_1Si_4B_{12}$ | 300 | 50 | 13.9 |
| 5-10 | $Fe_{bal.}Cu_1W_1Si_4B_{12}$ | 300 | 90 | 13.5 |
| 5-11 | $Fe_{bal.}Cu_{1.35}Si_4B_{12}P_1$ | 300 | 80 | 13.5 |
| 5-12 | $Fe_{bal.}Cu_{1.35}Si_4B_{12}P_3$ | 300 | 120 | 13.8 |
| 5-13 | $Fe_{bal.}Cu_{1.35}Si_4B_{12}C_1$ | 300 | 80 | 13.7 |
| 5-14 | $Fe_{bal.}Cu_{1.35}Si_4B_{12}S_1$ | 300 | 50 | 13.4 |
| 5-15 | $Fe_{bal.}Cu_{1.35}Si_4B_{12}Al_{0.5}$ | 300 | 55 | 13.4 |
| 5-16 | $Fe_{bal.}Cu_{1.35}Si_4B_{12}Ge_1$ | 300 | 100 | 13.6 |
| 5-17 | $Fe_{bal.}Cu_{1.35}Si_4B_{12}Ga_1$ | 300 | 95 | 13.7 |
| 5-18 | $Fe_{bal.}Cu_{1.35}Si_4B_{12}Be_1$ | 300 | 80 | 13.5 |
| 5-19 | $Fe_{bal.}Ni_1Cu_{1.35}Si_4B_{12}$ | 300 | 55 | 14.2 |
| 5-20 | $Fe_{bal.}Ni_3Cu_{1.35}Si_4B_{12}$ | 300 | 55 | 14.5 |
| 5-21 | $Fe_{bal.}Co_1Cu_{1.35}Si_4B_{12}$ | 300 | 65 | 14.0 |
| 5-22 | $Fe_{bal.}Mn_1Cu_{1.35}Si_4B_{12}$ | 300 | 50 | 14.3 |
| 5-23 | $Fe_{bal.}Cr_1Cu_{1.35}Si_4B_{12}$ | 300 | 60 | 14.2 |
| 5-24 | $Fe_{bal.}V_1Cu_{1.35}Si_4B_{12}$ | 300 | 65 | 13.9 |
| 5-25 | $Fe_{bal.}Ti_{0.1}Cu_{1.35}Si_4B_{12}$ | 300 | 75 | 13.4 |

| Sample | Average B Concentration in Matrix Phase (atomic %) | Core Loss $P_{10/1k}$ (W/kg) | Corrosion Resistance |
|---|---|---|---|
| 5-1 | 12.0 | 5.1 | Excellent |
| 5-2 | 12.1 | 5.1 | Excellent |
| 5-3 | 12.3 | 5.0 | Excellent |
| 5-4 | 11.9 | 5.4 | Excellent |
| 5-5 | 12.1 | 4.1 | Excellent |
| 5-6 | 12.1 | 4.5 | Excellent |
| 5-7 | 12.1 | 4.8 | Excellent |
| 5-8 | 12.2 | 5.2 | Excellent |
| 5-9 | 11.8 | 4.8 | Excellent |
| 5-10 | 11.9 | 5.1 | Excellent |
| 5-11 | 12.1 | 5.9 | Excellent |
| 5-12 | 12.2 | 5.9 | Excellent |
| 5-13 | 12.1 | 6.7 | Excellent |
| 5-14 | 12.0 | 8.7 | Excellent |
| 5-15 | 12.1 | 9.4 | Excellent |
| 5-16 | 12.2 | 7.8 | Excellent |
| 5-17 | 11.9 | 7.7 | Excellent |
| 5-18 | 12.1 | 8.1 | Excellent |
| 5-19 | 12.2 | 6.0 | Excellent |
| 5-20 | 12.1 | 6.1 | Excellent |
| 5-21 | 12.2 | 5.9 | Excellent |
| 5-22 | 12.0 | 5.9 | Excellent |
| 5-23 | 11.9 | 6.4 | Excellent |
| 5-24 | 12.0 | 6.5 | Excellent |
| 5-25 | 12.2 | 6.9 | Excellent |

As is clear from Table 6, Ni, Mn, Co, V, Cr, Ti, Zr, Nb, Mo, Hf, Ta and W had an effect of stabilizing high-B-concentration, amorphous layers as deep as 30-130 nm from the surface, providing any alloys with good insulation. With good oxide films formed at depth of about 20 nm from the surface, the concentrations of Cu in the oxide films were minimum, 70% or less of the average concentration in the matrix phases. Thus, good insulation characteristics and low core loss were obtained.

Example 5

An alloy melt having the composition of $Fe_{bal.}Cu_{1.35}Si_3B_{11}$ was quenched in the air by a single-roll method, and stripped from the cooling roll at 250° C. to obtain a primary fine-crystalline alloy ribbon of 5 mm in width and 18 μm in thickness having a structure, in which fine crystal nuclei having an average diameter of 30 nm or less were dispersed at a volume fraction of 25% in an amorphous phase. The stripping temperature of the primary fine-crystalline alloy ribbon was measured by the above method.

This primary fine-crystalline alloy ribbon was placed in a furnace having a nitrogen atmosphere having an oxygen concentration of 10%, heated to the highest temperature of 420° C. at an average temperature-elevating speed of 30° C./minute, and kept at this highest temperature for 1 hour for a nano-crystallization heat treatment, to produce a soft magnetic alloy ribbon. The average diameter and volume fraction of fine crystal grains in this soft magnetic alloy ribbon were measured by the methods described below. It was thus found that this soft magnetic alloy ribbon had a structure in which fine crystal grains having an average diameter of 60 nm or less were dispersed in an amorphous phase at a volume fraction of 50% or more.

Figure 7A:
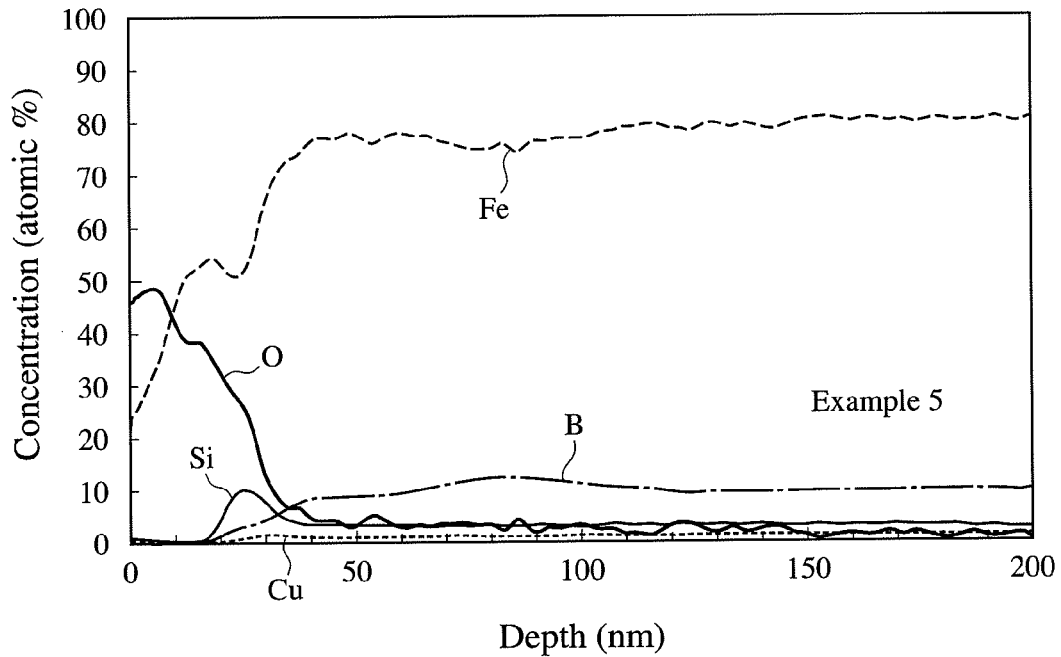
FIG. 7(a) is a graph showing the relation between the concentration distributions of Fe, B, Si, Cu and O and depth, in the soft magnetic alloy ribbon of Example 5 having a composition of $Fe_{bal.}Cu_{1.35}Si_3B_{11}$.
Figure 7B:
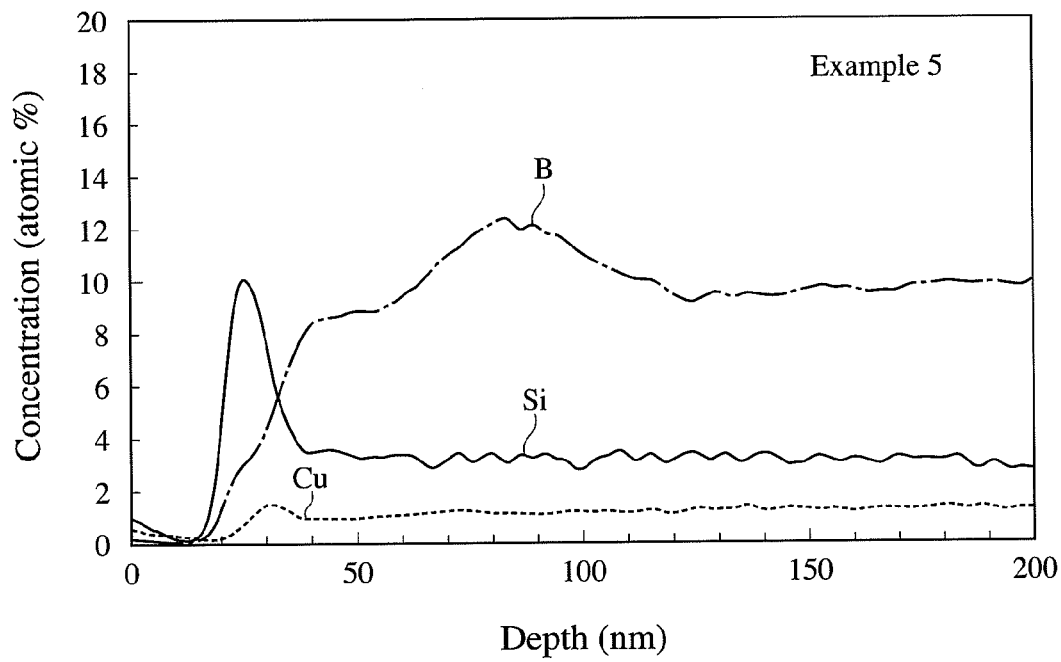
FIG. 7(b) is a graph showing in detail the relation between the concentration distributions of B, Si and Cu and depth in the graph of FIG. 7(a).
Figure 7C:
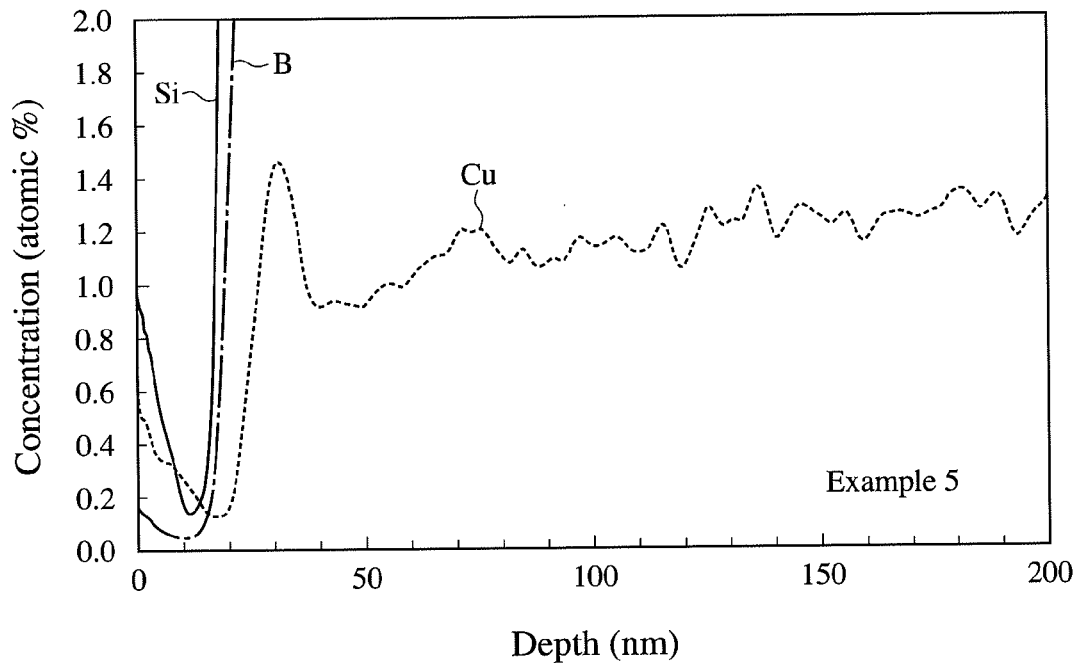
FIG. 7(c) is a graph showing in detail the relation between the concentration distribution of Cu and depth in the graph of FIG. 7(a).

The concentration distributions of Fe, B, Si, Cu and O from the free surface (not contacted with the cooling roll) toward inside in this soft magnetic alloy ribbon were measured by the methods described below. The results are shown in FIGS. 7(a)-7(c). The depth of 0 nm corresponds to the surface of the alloy ribbon. An oxide layer containing Fe and Si [(Si+Fe) oxide layer] was formed in a depth of about 0-10 nm from the surface, a high-Fe-concentration oxide layer was formed in a depth of about 10-20 nm, and a high-Si-concentration oxide layer was formed in a depth of about 20-40 nm. The concentration of B was low in the oxide film, minimum in the high-Fe-concentration oxide layer to form a low-B-concentration layer, and increased in the high-Si-concentration oxide layer.

Observation by a transmission electron microscope (TEM) revealed that an alloy layer beneath the oxide film having the (Si+Fe) oxide layer, the high-Fe-concentration oxide layer and the high-Si-concentration oxide layer was composed of a nano-crystalline layer, an amorphous layer and a nano-crystalline matrix phase in this order from the surface. A boundary between the high-Si-concentration oxide layer and the nano-crystalline layer was near a depth of 30 nm, at which Cu was the maximum. This appears to be due to the fact that Cu segregated by diffusion by the heat treatment acted as nuclei to form the nano-crystalline layer. The concentration of B was the maximum near a depth of 80 nm in the amorphous layer, and high-concentration B appears to stabilize the amorphous layer.

To obtain such cross section structure, it is important to suppress the diffusion of Cu and B to the oxide film. The concentration of B was about 0.4 atomic %, minimum in the high-Fe-concentration oxide layer. Up to the depth of 10 nm, the Cu/Fe atomic ratio was as low as 2% or less, and the B/Fe atomic ratio was as low as 1% or less.

Comparative Example 2

Figure 8A:
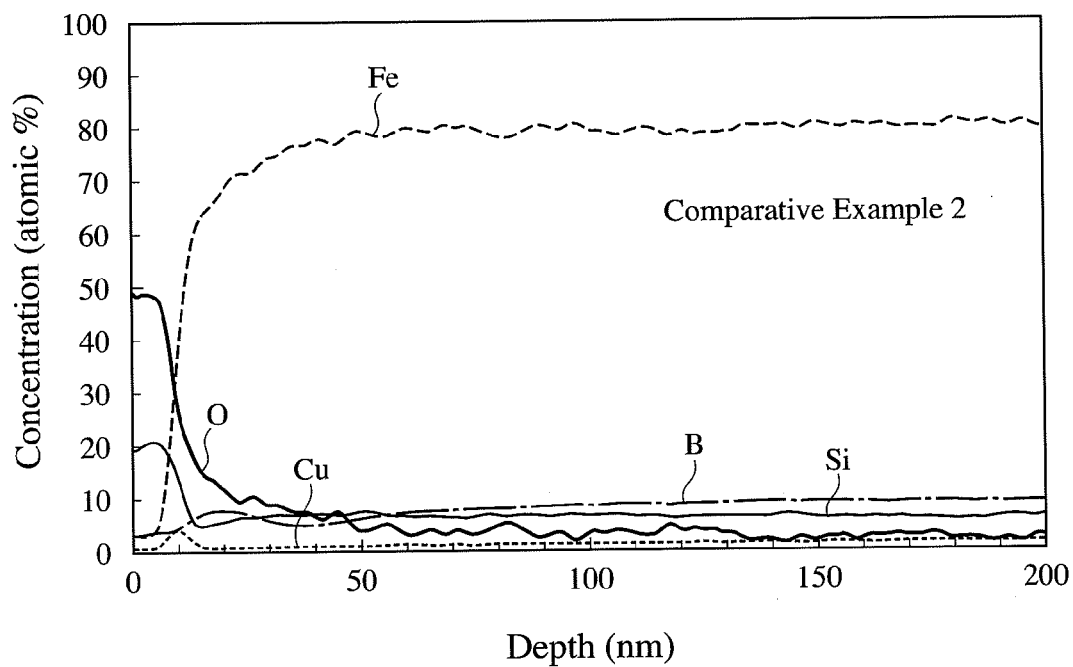
FIG. 8(a) is a graph showing the relation between the concentration distributions of Fe, B, Si, Cu and O and depth, in the soft magnetic alloy ribbon of Comparative Example 2 having a composition of $Fe_{bal.}Cu_{1.35}Si_3B_{11}$.
Figure 8B:
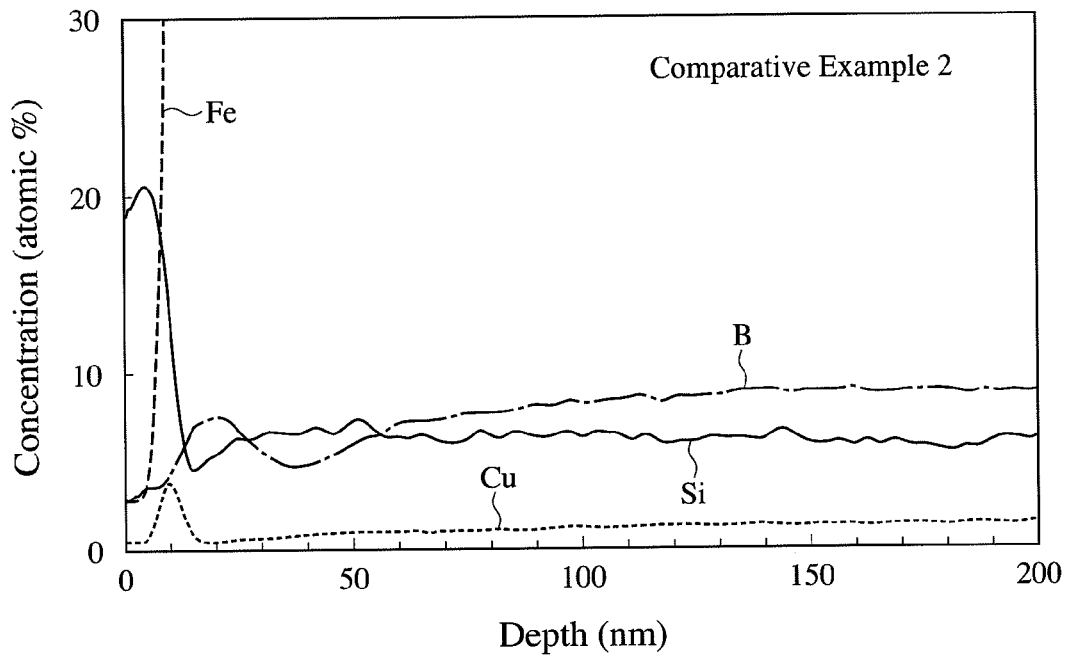
FIG. 8(b) is a graph showing in detail the relation between the concentration distributions of B, Si and Cu and depth in the graph of FIG. 8(a).
Figure 8C:
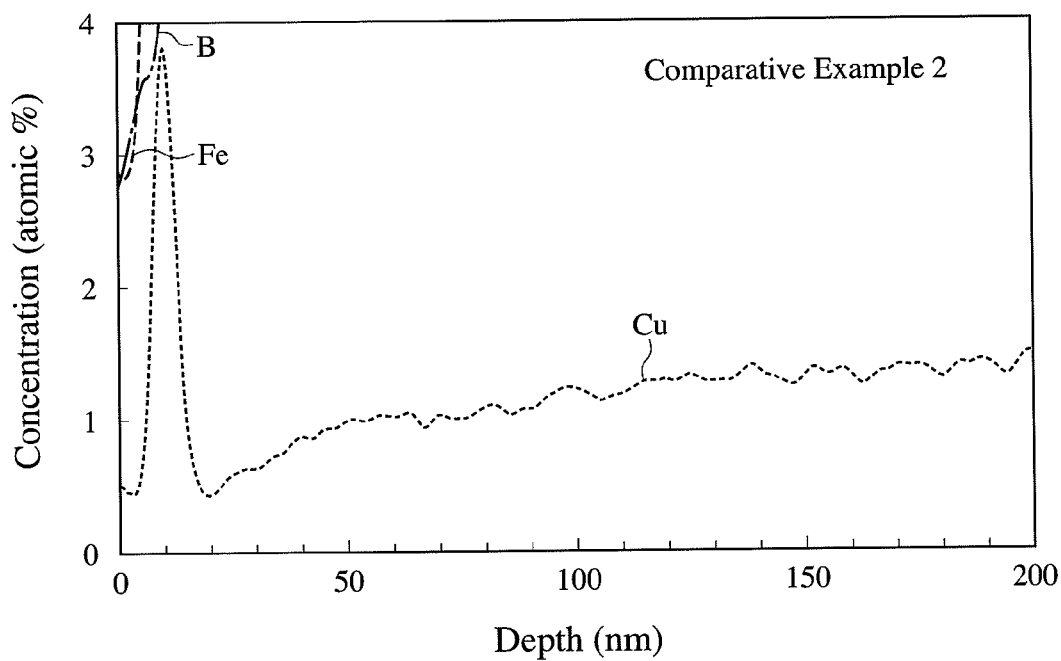
FIG. 8(c) is a graph showing in detail the relation between the concentration distribution of Cu and depth in the graph of FIG. 8(a).

A soft magnetic alloy ribbon of 5 mm in width and 18 μm in thickness was produced from an alloy melt having the composition of $Fe_{bal.}Cu_{1.35}Si_3B_{11}$, in the same manner as in Example 5 except for changing the heat treatment atmosphere to vacuum with an oxygen concentration of less than 1%. The distribution of each element in this soft magnetic alloy ribbon was measured by GDOES. The results are shown in FIGS. 8(a)-8(c). As is clear from FIGS. 8(a)-8(c), the soft magnetic alloy ribbon had a high-Si-concentration surface oxide layer, which is considered to have been formed by quenching. While quenching, Si having low surface tension tends to be segregated to the surface by combination with oxygen. B and Cu having low surface tension also tend to be segregated to the surface. Because of no oxidation in a heat treatment in vacuum, the oxide film formed by quenching does not grow. Thus, the oxide film is substantially composed of high-Si-concentration oxides, containing a large amount of B. The amount of B increases when nearing the depth of 20 nm in the alloy layer, but decreases near the depth of 40 nm, forming the low-B-concentration layer. This appears to be due to the fact that the diffusion of B in the oxide film lowered the concentration of B in a surface region of the alloy layer. Crystal grains were as coarse as having an average diameter of 50 nm or more in the low-B-concentration layer in the alloy layer, forming no amorphous layer. As a result, there is large effective crystal magnetic anisotropy, failing to obtain good soft magnetic properties.

Example 6

Figure 9:
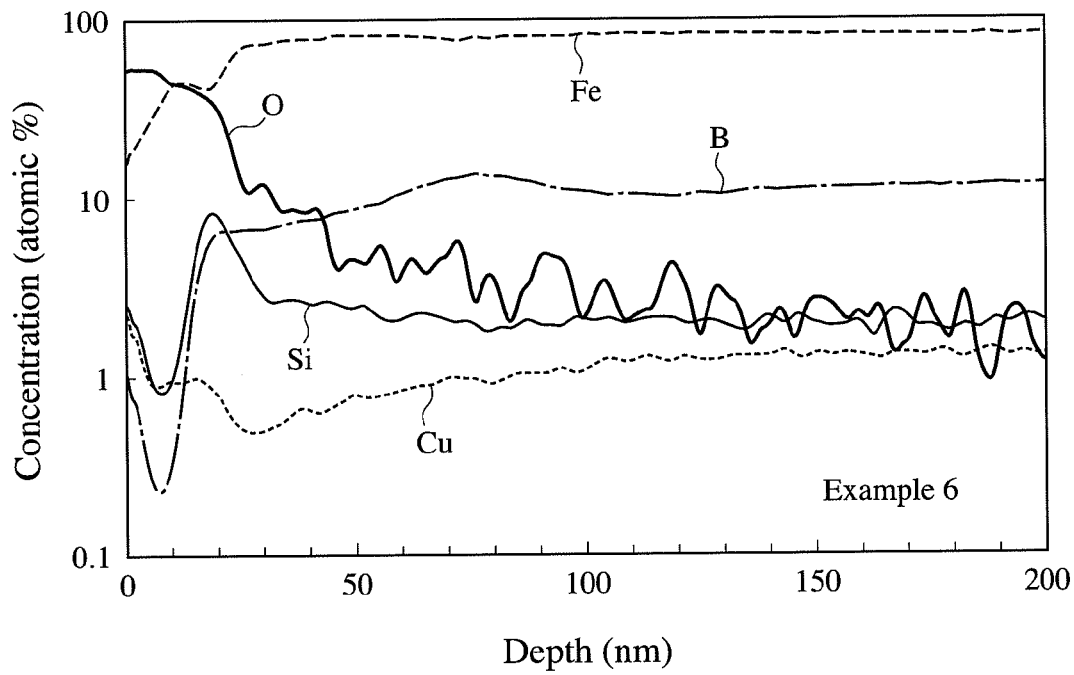
FIG. 9 is a graph showing the relation between the concentration distributions of Fe, B, Si, Cu and O and depth, in the soft magnetic alloy ribbon of Example 6 having a composition of $Fe_{bal.}Cu_{1.35}Si_2B_{12}$.

A soft magnetic alloy ribbon was produced from an alloy melt having the composition of $Fe_{bal.}Cu_{1.35}Si_2B_{12}$, in the same manner as in Example 5. The distributions of elements in this soft magnetic alloy ribbon were measured by GDOES. The results are shown in FIG. 9. This soft magnetic alloy ribbon had substantially the same element distributions as in Example 5.

Example 7

Produced from alloy melts having the compositions shown in Table 7 in the same manner as in Example 5 were primary fine-crystalline alloy ribbons of 5 mm in width and 16-25 μm in thickness each having a structure, in which fine crystal grains having an average diameter of 30 nm or less were dispersed in an amorphous phase at a volume fraction of 2-25%. These primary fine-crystalline alloy ribbons were subject to a nano-crystallization heat treatment in a nitrogen gas having an oxygen concentration of 15%, to produce soft magnetic alloy ribbons. The average diameter and volume fraction of fine crystal grains in each soft magnetic alloy ribbon were measured by the methods described below. It was thus found that each soft magnetic alloy ribbon had a structure in which fine crystal grains having an average diameter of 60 nm or less were dispersed in an amorphous phase at a volume fraction of 50% or more. The concentration distributions of Fe, B and Cu and corrosion resistance of each soft magnetic alloy ribbon were measured by the above methods. The average concentrations (atomic %) of Fe, B and Cu up to the depth of 10 nm from the surface, the Cu/Fe atomic ratio (%), the B/Fe atomic ratio (%), the concentration distribution of B in the alloy layer, and the corrosion resistance are shown in Table 7.

Comparative Example 3

Soft magnetic alloy ribbons were produced from alloy melts having the compositions shown in Table 8 in the same manner as in Example 5 except for changing the heat treatment atmosphere to vacuum at $10^4$ Torr, and measured as in Example 7. The results are shown in Table 8.

TABLE 7

| Sample | Composition | Average Concentration in Depth up to 10 nm (atomic %) | | | Cu/Fe (%) | B/Fe (%) |
|---|---|---|---|---|---|---|
| | | Fe | Cu | B | | |
| 6-1 | $Fe_{bal.}Cu_{1.35}Si_4B_{12}$ | 31 | 0.9 | 0.1 | 2.9 | 0.3 |
| 6-2 | $Fe_{bal.}Cu_{1.5}Si_4B_{12}$ | 27 | 1.1 | 0.3 | 4.1 | 1.1 |
| 6-3 | $Fe_{bal.}Cu_{1.5}Si_5B_{12}$ | 26 | 1.0 | 0.4 | 3.8 | 1.5 |
| 6-4 | $Fe_{bal.}Cu_{1.5}Si_6B_{12}$ | 28 | 0.8 | 0.2 | 2.9 | 0.7 |
| 6-5 | $Fe_{bal.}Cu_{1.55}Si_7B_{12}$ | 25 | 0.8 | 0.3 | 3.2 | 1.2 |
| 6-6 | $Fe_{bal.}Cu_{1.6}Si_8B_{12}$ | 26 | 0.1 | 0.1 | 0.4 | 0.4 |
| 6-7 | $Fe_{bal.}Cu_{1.35}Si_3B_{13}$ | 31 | 1.2 | 0.9 | 3.9 | 2.9 |
| 6-8 | $Fe_{bal.}Cu_{1.35}Si_4B_{13}$ | 33 | 1.2 | 0.9 | 3.6 | 2.7 |
| 6-9 | $Fe_{bal.}Cu_{1.5}Si_5B_{13}$ | 29 | 1.0 | 0.9 | 3.4 | 3.1 |
| 6-10 | $Fe_{bal.}Cu_{1.6}Si_7B_{13}$ | 28 | 1.1 | 0.5 | 3.9 | 1.8 |
| 6-11 | $Fe_{bal.}Cu_{1.6}Si_8B_{13}$ | 32 | 0.8 | 0.2 | 2.5 | 0.6 |
| 6-12 | $Fe_{bal.}Cu_{1.6}Si_9B_{13}$ | 28 | 0.8 | 0.1 | 2.9 | 0.4 |
| 6-13 | $Fe_{bal.}Cu_{1.35}Si_2B_{14}$ | 28 | 0.8 | 0.5 | 2.9 | 1.8 |
| 6-14 | $Fe_{bal.}Cu_{1.35}Si_3B_{14}$ | 27 | 0.9 | 0.6 | 3.3 | 2.2 |
| 6-15 | $Fe_{bal.}Cu_{1.35}Si_4B_{14}$ | 26 | 1.5 | 0.3 | 5.8 | 1.2 |
| 6-16 | $Fe_{bal.}Cu_{1.5}Si_4B_{14}$ | 27 | 1.2 | 0.6 | 4.4 | 2.2 |
| 6-17 | $Fe_{bal.}Cu_{1.5}Si_5B_{14}$ | 22 | 1.1 | 0.2 | 5.0 | 0.9 |
| 6-18 | $Fe_{bal.}Cu_{1.5}Si_6B_{14}$ | 21 | 1.8 | 0.3 | 8.6 | 1.4 |
| 6-19 | $Fe_{bal.}Cu_{1.35}Si_2B_{15}$ | 29 | 1.0 | 0.8 | 3.4 | 2.8 |
| 6-20 | $Fe_{bal.}Cu_{1.35}Si_3B_{15}$ | 30 | 1.3 | 0.5 | 4.3 | 1.7 |
| 6-21 | $Fe_{bal.}Cu_{1.5}Si_3B_{15}$ | 30 | 0.9 | 0.9 | 3.0 | 3.0 |
| 6-22 | $Fe_{bal.}Cu_{1.35}Si_4B_{15}$ | 25 | 1.2 | 0.5 | 4.8 | 2.0 |
| 6-23 | $Fe_{bal.}Cu_{1.5}Si_5B_{15}$ | 32 | 1.4 | 0.4 | 4.4 | 1.3 |
| 6-24 | $Fe_{bal.}Cu_{1.6}Si_6B_{15}$ | 22 | 2.0 | 0.6 | 9.1 | 2.7 |
| 6-25 | $Fe_{bal.}Cu_{1.5}Si_6B_{16}$ | 26 | 1.5 | 0.8 | 5.8 | 3.1 |
| 6-26 | $Fe_{bal.}Cu_{1.35}Si_3B_{16}$ | 27 | 0.9 | 0.5 | 3.3 | 1.9 |
| 6-27 | $Fe_{bal.}Cu_{1.6}Si_5B_{16}$ | 34 | 2.0 | 0.9 | 5.9 | 2.6 |
| 6-28 | $Fe_{bal.}Cu_{1.5}Si_2B_{18}$ | 28 | 1.4 | 0.9 | 5.0 | 3.2 |
| 6-29 | $Fe_{bal.}Cu_{1.6}Si_2B_{20}$ | 36 | 1.6 | 1.0 | 4.4 | 2.8 |

TABLE 7-continued

| | Concentration Distribution of B (atomic %) | | | | |
|---|---|---|---|---|---|
| | In Oxide Film | | In Alloy Layer | | Corrosion |
| Sample | Minimum | Surface[1] | Maximum | Depth[2] | Resistance |
| 6-1 | 0.08 | 0.69 | 13.1 | 80 | Excellent |
| 6-2 | 0.13 | 0.82 | 13.2 | 80 | Excellent |
| 6-3 | 0.17 | 0.79 | 12.9 | 80 | Excellent |
| 6-4 | 0.15 | 0.25 | 12.8 | 90 | Excellent |
| 6-5 | 0.11 | 0.70 | 13.0 | 90 | Excellent |
| 6-6 | 0.12 | 0.23 | 13.3 | 90 | Excellent |
| 6-7 | 0.24 | 0.97 | 14.2 | 70 | Excellent |
| 6-8 | 0.49 | 1.25 | 14.5 | 80 | Excellent |
| 6-9 | 0.36 | 1.20 | 14.1 | 80 | Excellent |
| 6-10 | 0.10 | 0.74 | 14.0 | 90 | Excellent |
| 6-11 | 0.13 | 0.26 | 14.3 | 90 | Excellent |
| 6-12 | 0.10 | 0.15 | 14.2 | 90 | Excellent |
| 6-13 | 0.18 | 0.68 | 15.3 | 70 | Excellent |
| 6-14 | 0.25 | 0.81 | 15.4 | 70 | Excellent |
| 6-15 | 0.16 | 0.51 | 14.9 | 80 | Excellent |
| 6-16 | 0.22 | 0.96 | 15.1 | 80 | Excellent |
| 6-17 | 0.11 | 0.63 | 15.1 | 80 | Excellent |
| 6-18 | 0.14 | 0.47 | 15.2 | 80 | Excellent |
| 6-19 | 0.38 | 1.09 | 16.1 | 70 | Excellent |
| 6-20 | 0.24 | 0.81 | 16.0 | 70 | Excellent |
| 6-21 | 0.73 | 1.08 | 16.5 | 70 | Excellent |
| 6-22 | 0.19 | 0.77 | 16.4 | 80 | Excellent |
| 6-23 | 0.15 | 0.79 | 16.5 | 80 | Excellent |
| 6-24 | 0.14 | 0.73 | 16.2 | 80 | Excellent |
| 6-25 | 0.57 | 1.04 | 17.0 | 80 | Excellent |
| 6-26 | 0.30 | 0.80 | 17.2 | 80 | Excellent |
| 6-27 | 0.70 | 1.02 | 17.1 | 80 | Excellent |
| 6-28 | 0.56 | 1.37 | 19.5 | 70 | Excellent |
| 6-29 | 0.72 | 1.45 | 21.2 | 70 | Excellent |

Note:
[1]The concentration of B at the oxide film surface.
[2]The depth (nm) at the maximum concentration of B from the surface.

TABLE 8

| | | Average Concentration in Depth up to 10 nm (atomic %) | | | Cu/Fe | B/Fe |
|---|---|---|---|---|---|---|
| Sample | Composition | Fe | Cu | B | (%) | (%) |
| 7-1 | $Fe_{bal.}Cu_{1.35}Si_4B_{12}$ | 9 | 2.2 | 5 | 24.4 | 55.6 |
| 7-2 | $Fe_{bal.}Cu_{1.35}Si_3B_{13}$ | 7 | 3.0 | 12 | 42.9 | 171.4 |
| 7-3 | $Fe_{bal.}Cu_{1.6}Si_9B_{13}$ | 9 | 2.5 | 4 | 27.8 | 44.4 |
| 7-4 | $Fe_{bal.}Cu_{1.35}Si_2B_{14}$ | 11 | 2.1 | 12 | 19.1 | 109.1 |
| 7-5 | $Fe_{bal.}Cu_{1.35}Si_2B_{15}$ | 9 | 4.0 | 4 | 44.4 | 44.4 |
| 7-6 | $Fe_{bal.}Cu_{1.6}Si_6B_{15}$ | 8 | 1.9 | 7 | 23.8 | 87.5 |
| 7-7 | $Fe_{bal.}Cu_{1.6}Si_5B_{16}$ | 9 | 2.0 | 9 | 22.2 | 100.0 |
| 7-8 | $Fe_{bal.}Cu_{1.5}Si_2B_{18}$ | 10 | 2.1 | 11 | 21.0 | 110.0 |
| 7-9 | $Fe_{bal.}Cu_{1.6}Si_2B_{20}$ | 9 | 3.0 | 10 | 33.3 | 111.1 |

| | Concentration Distribution of B (atomic %) | | | | |
|---|---|---|---|---|---|
| | In Oxide Film | | In Alloy Layer | | Corrosion |
| Sample | Minimum | Surface[1] | Maximum | Depth[2] | Resistance |
| 7-1 | 1.39 | 2.18 | 14.5 | 40 | Fair |
| 7-2 | 1.92 | 4.33 | 16.1 | 35 | Fair |
| 7-3 | 0.89 | 1.65 | 16.0 | 35 | Fair |
| 7-4 | 2.10 | 5.80 | 15.9 | 30 | Fair |
| 7-5 | 0.94 | 2.87 | 17.9 | 35 | Fair |
| 7-6 | 1.88 | 3.56 | 17.4 | 40 | Fair |
| 7-7 | 2.07 | 6.24 | 18.0 | 35 | Fair |
| 7-8 | 1.90 | 5.31 | 20.3 | 35 | Fair |
| 7-9 | 1.41 | 4.49 | 21.8 | 35 | Fair |

Note:
[1]The concentration of B at the oxide film surface.
[2]The depth (nm) at the maximum concentration of B from the surface.

As is clear from Table 7, each soft magnetic alloy ribbon of Example 7 had an average Fe concentration of 10 atomic % or more and an average B concentration of 1 atomic % or less in a depth up to 10 nm from the surface, as well as B/Fe of about 3% or less, and Cu/Fe of less than 10%. The minimum B concentration in the oxide film was as low as about 0.7% or less. The observation of the microstructure and the element distributions in a thickness direction in each soft magnetic alloy ribbon revealed that an alloy layer beneath the oxide film having a low-B-concentration layer had a nano-crystalline layer, a high-B-concentration, amorphous layer, and a nano-crystalline matrix phase in this order from the surface. Also, the soft magnetic alloy ribbons of Example 7 had excellent corrosion resistance. With such characteristic structure, stress between the amorphous layer and the matrix phase having different thermal expansion coefficients near the surface appears to induce slight anisotropy in a longitudinal direction, thereby increasing the squareness ratio of the B—H curve.

Wound cores formed by the soft magnetic alloy ribbons of Example 7 had extremely small core loss of 10 A/m or less at 50 Hz, due to the fact that a strong surface oxide layer increased insulation between the ribbons, suppressing eddy current. Because the soft magnetic alloy ribbons of the present invention have oxide layers with excellent insulation, they can surely suppress eddy current even in the form of laminate cores, etc.

On the other hand, the soft magnetic alloy ribbons of Comparative Example 3 had a high B concentration (about 1% or more at minimum) in an oxide film, forming no low-B-concentration layer. The observation of microstructure and element distributions in a thickness direction revealed that each soft magnetic alloy ribbon clearly did not have a layer structure comprising a nano-crystalline layer, a high-B-concentration, amorphous layer, and a nano-crystalline matrix phase. Accordingly, there was no magnetic anisotropy due to stress on the surface, resulting in a low squareness ratio of the B—H curve. Also, not-so-strong oxide layers are likely to suffer stripping and insulation breakage during the formation of wound cores. Accordingly, eddy current is generated between the ribbons, resulting in large core loss.

Example 8

Soft magnetic alloy ribbons were produced from an alloy melt having the composition of $Fe_{bal.}Cu_{1.35}Si_2B_{12}$, in the same manner as in Example 5 except for changing the oxygen concentration of the heat treatment atmosphere. The measurement of the average diameter and volume fraction of fine crystal grains by the same methods as in Example 7 revealed that each soft magnetic alloy ribbon had a structure in which fine crystal grains having an average diameter of 60 nm or less were dispersed in an amorphous phase at a volume fraction of 50% or more. Each soft magnetic alloy ribbon was measured with respect to the concentration distributions of Fe, B and Cu, corrosion resistance, curvature, squareness ratio (defined by a ratio $B_r/B_{80}$ of a residual magnetic flux density $B_r$ to a magnetic flux density $B_{80}$ at 80 A/m) and coercivity $H_c$. The curvature is expressed by the radius of curvature R (m) of each annealed, soft magnetic alloy ribbon, and the radius of curvature is proportional to the thickness of an oxide film generated by the heat treatment. The results are shown in Table 9.

TABLE 9

| Sample | Composition | Oxygen Concentration[1] (%) | Average Concentrations in Depth up to 10 nm (atomic %) | | | Cu/Fe (%) | B/Fe (%) |
|---|---|---|---|---|---|---|---|
| | | | Fe | Cu | B | | |
| 8-1 | $Fe_{bal.}Cu_{1.35}Si_4B_{12}$ | 0.02 | 14 | 4.0 | 15.0 | 28.6 | 107.1 |
| 8-2 | $Fe_{bal.}Cu_{1.35}Si_4B_{12}$ | 5 | 12 | 1.0 | 13.0 | 8.3 | 108.3 |
| 8-3 | $Fe_{bal.}Cu_{1.35}Si_4B_{12}$ | 7 | 27 | 1.0 | 1.3 | 3.7 | 4.8 |
| 8-4 | $Fe_{bal.}Cu_{1.35}Si_4B_{12}$ | 10 | 27 | 1.0 | 1.0 | 3.7 | 3.7 |
| 8-5 | $Fe_{bal.}Cu_{1.35}Si_4B_{12}$ | 13 | 33 | 0.9 | 1.0 | 2.7 | 3.0 |
| 8-6 | $Fe_{bal.}Cu_{1.35}Si_4B_{12}$ | 18 | 32 | 1.0 | 0.4 | 3.1 | 1.3 |
| 8-7 | $Fe_{bal.}Cu_{1.35}Si_4B_{12}$ | 20 | 34 | 0.8 | 0.5 | 2.4 | 1.5 |

Note:
[1] Oxygen concentration (%) in the heat treatment atmosphere.

| Sample | Concentration Distribution of B (atomic %) in Oxide Film | | Corrosion Resistance | R[2] (m) | Magnetic Properties | |
|---|---|---|---|---|---|---|
| | Minimum | Surface[1] | | | $B_r/B_{80}$[3] (%) | Coercivity Hc (A/m) |
| 8-1 | 3.38 | 4.98 | Fair | ≥1 | 80 | 7.2 |
| 8-2 | 1.37 | 1.49 | Fair | ≥1 | 82 | 7.2 |
| 8-3 | 0.82 | 1.39 | Good | ≥1 | 86 | 7.2 |
| 8-4 | 0.70 | 1.12 | Good | ≥1 | 88 | 7.2 |
| 8-5 | 0.70 | 1.14 | Good | ≥1 | 90 | 7.0 |
| 8-6 | 0.19 | 0.51 | Excellent | ≥1 | 92 | 6.8 |
| 8-7 | 0.16 | 0.29 | Excellent | 0.65 | 93 | 6.9 |

Note:
[1] The concentration of B at the oxide film surface.
[2] Radius of curvature.
[3] Squareness ratio.

As is clear from Table 9, when the oxygen concentration is 5% or less, the resultant soft magnetic alloy ribbon has poor corrosion resistance, as well as high B/Fe and Cu/F without the suppression of the diffusion of B and Cu. On the other hand, when the oxygen concentration exceeded 18%, too vigorous oxidation occurred on the thin alloy film surface, forming a thick oxide film, which made the curvature of the thin alloy film larger. Further, when the oxygen concentration exceeded 30%, the squareness ratio $B_r/B_{80}$ became less than 90%, and the coercivity $H_c$ exceeded 10 A/m.

Example 9

Initial fine-crystalline alloy ribbons of 5 mm in width and 16-25 μm in thickness each having a structure, in which fine crystal grains having an average diameter of 30 nm or less were dispersed at a volume fraction of 2-25% in an amorphous phase, were produced from alloy melts having the compositions shown in Table 10, in the same manner as in Example 7. Each primary fine-crystalline alloy ribbon was subject to a nano-crystallization heat treatment under the same conditions as in Example 7 except for changing the oxygen concentration in the heat treatment atmosphere to 10%, to produce a soft magnetic alloy ribbon. The measurement of the average diameter and volume fraction of fine crystal grains by the same methods as in Example 7 revealed that each soft magnetic alloy ribbon had a structure in which fine crystal grains having an average diameter of 60 nm or less were dispersed at a volume fraction of 50% or more. The same measurement as in Example 7 was conducted on each soft magnetic alloy ribbon. The results are shown in Table 10.

TABLE 10

| Sample | Composition | Average Concentrations in Depth up to 10 nm (atomic %) | | | Cu/Fe (%) | B/Fe (%) |
|---|---|---|---|---|---|---|
| | | Fe | Cu | B | | |
| 9-1 | $Fe_{bal.}Cu_{1.35}Si_4B_{12}Nb_{0.1}$ | 24 | 1.8 | 0.5 | 7.5 | 2.1 |
| 9-2 | $Fe_{bal.}Cu_{1.35}Si_4B_{12}Nb_{0.5}$ | 22 | 1.1 | 0.6 | 5.0 | 2.7 |
| 9-3 | $Fe_{bal.}Cu_{1.35}Si_4B_{12}Nb_{1.0}$ | 21 | 1.5 | 0.2 | 7.1 | 1.0 |
| 9-4 | $Fe_{bal.}Cu_{1.35}Si_4B_{12}Nb_{1.5}$ | 24 | 1.5 | 0.8 | 6.3 | 3.3 |
| 9-5 | $Fe_{bal.}Ni_{1.0}Cu_{1.35}Si_4B_{12}$ | 22 | 1.2 | 0.4 | 5.5 | 1.8 |
| 9-6 | $Fe_{bal.}Co_{1.0}Cu_{1.35}Si_4B_{12}$ | 23 | 1.2 | 0.3 | 5.2 | 1.3 |
| 9-7 | $Fe_{bal.}Cu_{1.35}Si_4B_{12}Mn_1$ | 26 | 1.8 | 1.3 | 6.9 | 5.0 |
| 9-8 | $Fe_{bal.}Cu_{1.35}Si_4B_{12}Cr_{0.5}$ | 21 | 1.1 | 1.0 | 5.2 | 4.8 |
| 9-9 | $Fe_{bal.}Cu_{1.35}Si_4B_{12}V_{0.5}$ | 22 | 1.5 | 1.0 | 6.8 | 4.5 |
| 9-10 | $Fe_{bal.}Cu_{1.35}Si_4B_{12}Ti_{0.5}$ | 22 | 1.8 | 0.9 | 8.2 | 4.1 |
| 9-11 | $Fe_{bal.}Cu_{1.35}Si_4B_{12}Zr_{0.5}$ | 23 | 2.0 | 0.9 | 8.7 | 3.9 |
| 9-12 | $Fe_{bal.}Cu_{1.35}Si_4B_{12}Mo_{0.5}$ | 26 | 1.5 | 0.2 | 5.8 | 0.8 |
| 9-13 | $Fe_{bal.}Cu_{1.35}Si_4B_{12}Hf_{0.5}$ | 21 | 1.6 | 0.3 | 7.6 | 1.4 |
| 9-14 | $Fe_{bal.}Cu_{1.35}Si_4B_{12}Ta_{0.5}$ | 22 | 1.7 | 0.3 | 7.7 | 1.4 |
| 9-15 | $Fe_{bal.}Cu_{1.35}Si_4B_{12}W_{0.5}$ | 23 | 1.1 | 0.4 | 4.8 | 1.7 |
| 9-16 | $Fe_{bal.}Cu_{1.35}Si_4B_{12}P_{0.5}$ | 25 | 0.8 | 0.1 | 3.2 | 0.4 |
| 9-17 | $Fe_{bal.}Cu_{1.35}Si_4B_{12}P_{1.0}$ | 26 | 0.9 | 0.1 | 3.5 | 0.4 |
| 9-18 | $Fe_{bal.}Cu_{1.35}Si_4B_{12}P_{2.0}$ | 21 | 0.8 | 0.1 | 3.8 | 0.5 |
| 9-19 | $Fe_{bal.}Cu_{1.35}Si_4B_{12}P_{4.0}$ | 22 | 0.9 | 0.1 | 4.1 | 0.5 |
| 9-20 | $Fe_{bal.}Ni_5Cu_{1.35}Si_4B_{12}$ | 23 | 1.5 | 0.7 | 6.5 | 3.0 |
| 9-21 | $Fe_{bal.}Co_5Cu_{1.35}Si_4B_{12}$ | 23 | 1.8 | 0.7 | 7.8 | 3.0 |
| 9-22 | $Fe_{bal.}Cu_{1.35}Si_4B_{12}S_{0.5}$ | 30 | 1.2 | 1.0 | 4.0 | 3.3 |
| 9-23 | $Fe_{bal.}Cu_{1.35}Si_4B_{12}C_{0.5}$ | 28 | 1.4 | 0.6 | 5.0 | 2.1 |
| 9-24 | $Fe_{bal.}Cu_{1.35}Si_4B_{12}Al_{0.5}$ | 27 | 0.7 | 0.8 | 2.6 | 3.0 |
| 9-25 | $Fe_{bal.}Cu_{1.35}Si_4B_{12}Ge_{0.5}$ | 30 | 1.2 | 0.9 | 4.0 | 3.0 |
| 9-26 | $Fe_{bal.}Cu_{1.35}Si_4B_{12}Ga_{0.5}$ | 26 | 0.7 | 0.7 | 2.7 | 2.7 |
| 9-27 | $Fe_{bal.}Cu_{1.35}Si_4B_{12}Be_{0.5}$ | 28 | 1.6 | 0.8 | 5.7 | 2.9 |

TABLE 10-continued

| | Concentration Distribution of B (atomic %) | | | | |
| --- | --- | --- | --- | --- | --- |
| | In Oxide Film | | In Alloy Layer | | Corrosion |
| Sample | Minimum | Surface[1] | Maximum | Depth[2] | Resistance |
| 9-1 | 0.13 | 0.53 | 13.2 | 70 | Excellent |
| 9-2 | 0.39 | 0.82 | 13.3 | 70 | Excellent |
| 9-3 | 0.10 | 0.46 | 13.2 | 80 | Excellent |
| 9-4 | 0.45 | 1.23 | 14.0 | 75 | Excellent |
| 9-5 | 0.27 | 0.81 | 13.8 | 80 | Excellent |
| 9-6 | 0.10 | 0.54 | 13.3 | 70 | Excellent |
| 9-7 | 0.77 | 1.62 | 13.3 | 70 | Excellent |
| 9-8 | 0.72 | 1.22 | 13.2 | 70 | Excellent |
| 9-9 | 0.74 | 1.09 | 13.4 | 70 | Excellent |
| 9-10 | 0.25 | 1.37 | 14.0 | 70 | Excellent |
| 9-11 | 0.51 | 1.01 | 13.8 | 70 | Excellent |
| 9-12 | 0.11 | 0.32 | 13.5 | 80 | Excellent |
| 9-13 | 0.18 | 0.74 | 13.4 | 80 | Excellent |
| 9-14 | 0.20 | 0.58 | 13.6 | 80 | Excellent |
| 9-15 | 0.13 | 0.95 | 13.7 | 80 | Excellent |
| 9-16 | 0.10 | 0.13 | 13.4 | 75 | Excellent |
| 9-17 | 0.10 | 0.32 | 13.4 | 75 | Excellent |
| 9-18 | 0.10 | 0.15 | 13.8 | 75 | Excellent |
| 9-19 | 0.10 | 0.19 | 13.8 | 75 | Excellent |
| 9-20 | 0.40 | 0.95 | 13.3 | 80 | Excellent |
| 9-21 | 0.40 | 0.94 | 13.5 | 80 | Excellent |
| 9-22 | 0.70 | 1.05 | 13.4 | 80 | Excellent |
| 9-23 | 0.38 | 0.83 | 13.4 | 80 | Excellent |
| 9-24 | 0.50 | 0.88 | 13.5 | 80 | Excellent |
| 9-25 | 0.51 | 0.90 | 13.8 | 80 | Excellent |
| 9-26 | 0.42 | 0.80 | 13.6 | 80 | Excellent |
| 9-27 | 0.45 | 0.85 | 13.6 | 80 | Excellent |

Note:
[1]The concentration of B at the oxide film surface.
[2]The depth (nm) at the maximum concentration of B from the surface.

As is clear from Table 10, the soft magnetic alloy ribbons of Example 8 had Fe concentrations of 10 atomic % or more, B concentrations of 1 atomic % or less, and Cu concentrations of 2 atomic % or less on average in the depth from the surface to 10 nm. There were many samples having low-B-concentration layers in which the B concentrations were the minimum in the depth from the surface to 10 nm. The B/Fe was 5% or less, and the Cu/Fe was 10% or less. Each soft magnetic alloy ribbon had good corrosion resistance.

As shown in Table 10, the substitution of Fe by various elements did not largely increase the amounts of B and Cu contained in the oxide film, stably providing strong oxide films. Any soft magnetic alloy ribbons had high insulation and corrosion resistance. Accordingly, when wound to magnetic cores, the ribbons were sufficiently insulated, suppressing eddy current and thus providing low core loss.

Example 10

Figure 10A:
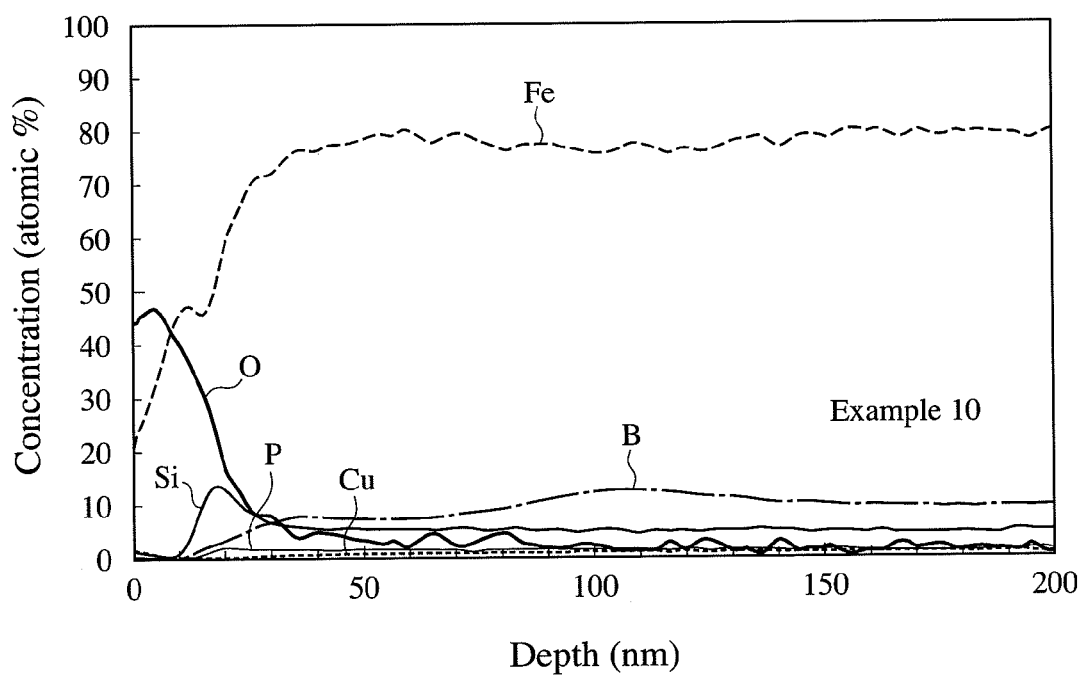
FIG. 10(a) is a graph showing the relation between the concentration distributions of Fe, B, Si, Cu, P and O and depth, in the soft magnetic alloy ribbon of Example 10 having a composition of $Fe_{bal.}Cu_{1.2}Si_5B_{11}P_2$.
Figure 10B:
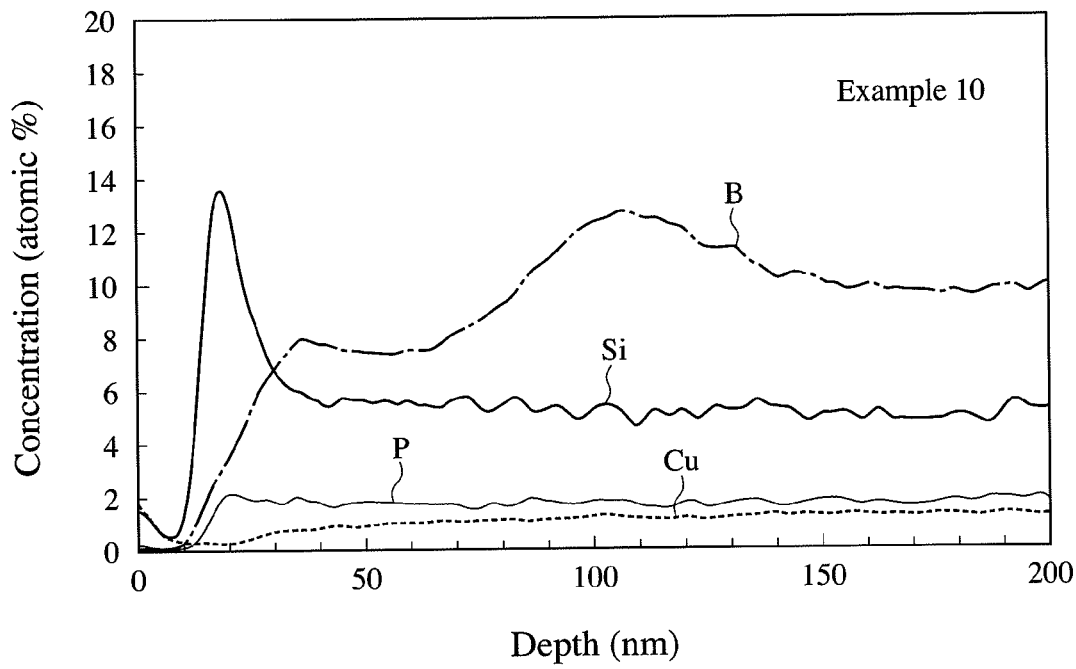
FIG. 10(b) is a graph showing in detail the relation between the concentration distributions of B, Si, Cu and P and depth in the graph of FIG. 10(a).
Figure 10C:
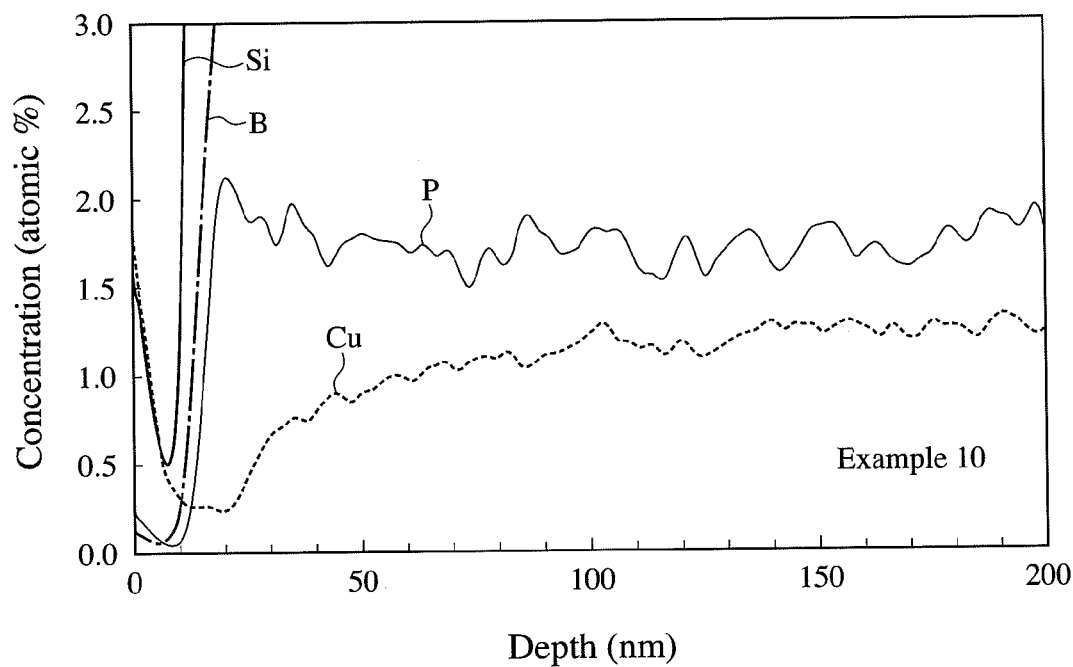
FIG. 10(c) is a graph showing in detail the relation between the concentration distributions of Cu and P and depth in the graph of FIG. 10(a).

FIGS. 10(a)-10(c) show element distributions in a depth direction in the alloy of $Fe_{bal.}Cu_{1.2}Si_5B_{11}P_2$ produced in the same manner as in Example 9. Though containing P, the element distributions of this alloy are similar to those shown in FIG. 1. Like B and Cu, P is easily segregated to the high-Si-concentration oxide layer, accelerating the formation of a layer structure comprising a nano-crystalline layer, an amorphous layer and a nano-crystalline matrix phase.

Example 11

Figure 11:
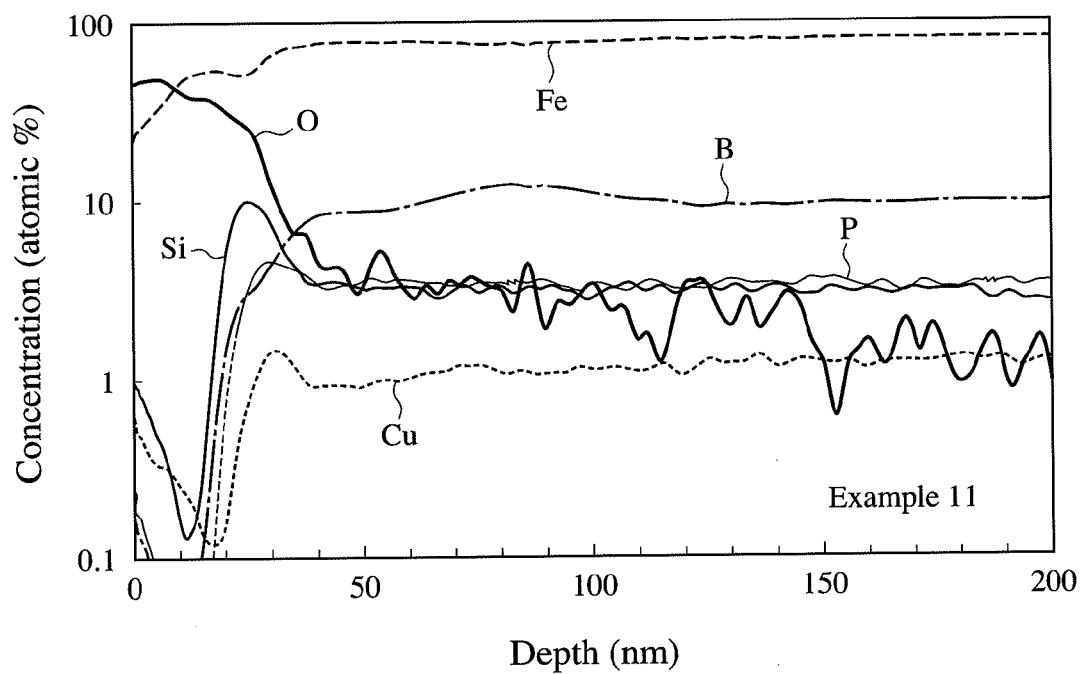
FIG. 11 is a graph showing the relation between the concentration distributions of Fe, B, Si, Cu, P and O and depth, in the soft magnetic alloy ribbon of Example 11 having a composition of $Fe_{bal.}Cu_{1.35}Si_4B_{12}P_4$.

FIG. 11 shows element distributions in a depth direction in the soft magnetic alloy ribbon of $Fe_{bal.}Cu_{1.35}Si_4B_{12}P_4$ (Sample 9-19) of Example 9. The element distributions shown in FIG. 11 were substantially the same as shown in FIGS. 10(a)-10(c).

Example 12

Soft magnetic alloy ribbons were produced from alloy melts having the compositions shown in Table 11, in the same manner as in Example 5 except for changing the temperature-elevating speed in the heat treatment step, and measured with respect to B concentration (atomic %) at the surface, the lowest B concentration (atomic %) in the low-B-concentration layer, the average concentrations (atomic %) of Fe, Cu and B in the depth from the surface to 10 nm, Cu/Fe, B/Fe, and corrosion resistance. The results are shown in Table 11.

TABLE 11

| | | Temperature-Elevating Speed | Average Concentration in Depth up to 10 nm (atomic %) | | |
| --- | --- | --- | --- | --- | --- |
| Sample | Composition | (° C./minute) | Fe | Cu | B |
| 10-1 | $Fe_{bal.}Cu_{1.6}Si_9B_{11}$ | 20 | 31 | 1.0 | 0.4 |
| 10-2 | $Fe_{bal.}Cu_{1.6}Si_9B_{11}$ | 100 | 32 | 0.9 | 0.2 |
| 10-3 | $Fe_{bal.}Cu_{1.6}Si_9B_{11}$ | 200 | 30 | 0.9 | 0.2 |

| Sample | Cu/Fe (%) | B/Fe (%) | Lowest B Concentration (atomic %) | Surface B Concentration (atomic %) | Corrosion Resistance |
| --- | --- | --- | --- | --- | --- |
| 10-1 | 3.2 | 1.3 | 0.75 | 0.90 | Excellent |
| 10-2 | 2.8 | 0.6 | 0.33 | 0.57 | Excellent |
| 10-3 | 3.0 | 0.7 | 0.28 | 0.59 | Excellent |

As is clear from Table 11, the temperature-elevating speed had substantially no influence on the element distributions and the characteristics. The formation of oxide films accompanying the diffusion of elements is possible even at high temperature-elevating speeds, meaning that the heat treatment atmosphere is more important than the temperature-elevating speed.

EFFECT OF THE INVENTION

The soft magnetic alloy ribbons of the present invention obtained by annealing primary fine-crystalline alloy ribbons formed by quenching in a low-oxygen-concentration atmosphere have not only a high saturation magnetic flux density and low core loss, but also excellent insulation, corrosion resistance and toughness.

What is claimed is:
1. A method for producing a soft magnetic alloy ribbon having a composition represented by $Fe_{100-x-y-z}A_xB_yX_z$, wherein A is Cu and/or Au, X is at least one element selected from the group consisting of Si, S, C, P, Al, Ge, Ga and Be, and x, y and z are numbers (by atomic %) meeting the conditions of $0<x\leq5$, $12\leq y\leq22$, $1\leq z\leq10$, and $x+y+z\leq25$, and comprising a matrix phase in which fine crystal grains having an average diameter of 60 nm or less are dispersed at a volume fraction of 50% or more in an amorphous phase, and an amorphous layer having a higher B concentration than in said matrix phase by 0.5 atomic % or more in a region at a depth 30-130 nm from the surface of the ribbon, comprising the steps of (1) ejecting an alloy melt having said composition onto a rotating cooling roll for quenching, to form a primary fine-crystalline alloy ribbon having a matrix phase, in which fine crystal nuclei having an average diameter of 30 nm or less are dispersed at a volume fraction of more than 0% and less than 30% in an amorphous phase, said primary fine-crystalline alloy ribbon being stripped from said cooling roll when reaching a temperature of 170-350° C.; and then (2) annealing said primary fine-crystalline alloy ribbon in an atmosphere containing an oxygen concentration of 6-18 vol. %.

2. A method for producing a soft magnetic alloy ribbon having a composition represented by $Fe_{100-x-y-z}A_xB_yX_z$, wherein A is Cu and/or Au, X is at least one element selected from the group consisting of Si, S, C, P, Al, Ge, Ga and Be, and x, y and z are numbers (by atomic %) meeting the conditions of $0<x\le5$, $10\le y\le22$, $1\le z\le10$, and $x+y+z\le25$, and comprising a matrix phase in which fine crystal grains having an average diameter of 60 nm or less are dispersed at a volume fraction of 50% or more, and a surface oxide film, part of said oxide film being a layer having a lower B concentration than the average B concentration of said matrix phase and a layer having a lower Cu concentration than the average Cu concentration in said matrix phase, wherein the average B concentration in a depth up to 10 nm from the surface is 1 atomic % or less, wherein the B/Fe atomic ratio in the oxide film in a depth up to 10 nm from the surface is 1/20 or less, wherein the average Cu concentration in a depth up to 10 nm from the surface is 2 atomic % or less, wherein the Cu/Fe atomic ratio in a depth up to 10 nm from the surface is 1/10 or less, and wherein the average Fe concentration in a depth up to 10 nm from the surface is 10 atomic % or more; comprising the steps of (1) ejecting an alloy melt having said composition onto a rotating cooling roll for quenching, to form a primary fine-crystalline alloy ribbon having a matrix phase, in which fine crystal nuclei having an average diameter of 30 nm or less are dispersed at a volume fraction of more than 0% and less than 30% in an amorphous phase, said primary fine-crystalline alloy ribbon being stripped from said cooling roll when reaching a temperature of 170-350° C.; and then (2) annealing said primary fine-crystalline alloy ribbon in an atmosphere having an oxygen concentration of 6-18 vol. %.

* * * * *